United States Patent [19]

Shiba et al.

[11] Patent Number: 5,033,671
[45] Date of Patent: Jul. 23, 1991

[54] HOT-WATER AND COLD-WATER MIXING DEVICE

[75] Inventors: Fumikazu Shiba; Yasukiyo Ueda, both of Nara; Hiroaki Yonekubo, Kyoto; Yukio Nagaoka, Nara; Yasuo Kidouchi, Yamatokouriyama, all of Japan

[73] Assignee: Matsushita Electric Industrial Co., Ltd., Japan

[21] Appl. No.: 490,231

[22] Filed: Mar. 8, 1990

[30] Foreign Application Priority Data

Mar. 9, 1989 [JP] Japan ................................. 1-57010

[51] Int. Cl.$^5$ ............................................. G05D 11/16
[52] U.S. Cl. ............................ 236/12.12; 137/101.19; 236/12.22
[58] Field of Search ................. 137/88, 100, 101.19; 236/12.12, 12.22

[56] References Cited

U.S. PATENT DOCUMENTS

| | | |
|---|---|---|
| 1,948,044 | 2/1934 | Myers et al. ............... 137/100 U X |
| 2,287,810 | 6/1942 | Lund ............................ 236/12.22 |
| 2,317,717 | 4/1943 | Bauman ...................... 236/12.22 |
| 3,135,280 | 6/1964 | Kozel . | 
| 3,561,482 | 2/1971 | Taplin ....................... 236/12.22 X |
| 3,565,289 | 2/1971 | Erickson ..................... 137/100 X |
| 4,711,392 | 12/1987 | Kidouchi et al. ............ 236/12.12 |

FOREIGN PATENT DOCUMENTS

| | | |
|---|---|---|
| 0297544 | 1/1989 | European Pat. Off. . |
| 0320564 | 6/1989 | European Pat. Off. . |
| 61-140685 | 6/1986 | Japan . |
| 250633 | 10/1968 | U.S.S.R. ......................... 137/100 |

Primary Examiner—Stephen M. Hepperle
Attorney, Agent, or Firm—Lowe, Price, LeBlanc & Becker

[57] ABSTRACT

A hot-water and cold-water mixing device is provided wherein a hot-water side valve element and a cold-water side valve element are provided for regulating the respective flow rates of hot and cold water flows. The valve elements are constructed so as to possess a temperature regulating function exercised by varying the hot-water to cold-water mixing ratio depending on a biasing force, and also an automatic pressure regulating function to automatically accommodate any sudden pressure changes. The water mixing device of the foregoing construction is compact in size and is capable of adjusting the final water temperature reliably and speedily.

32 Claims, 20 Drawing Sheets

HOT-WATER AND COLD-WATER MIXING DEVICE

BACKGROUND OF THE INVENTION

1. Field of the Invention:

The present invention relates to a water mixing device that mixes hot and cold water at a preset mixing ratio which can be regulated to obtain a desired final water temperature.

2. Description of the Related Art:

An example of such water mixing device as described is disclosed in Japanese Patent Laid-open Publication No. 61-140685 published on June 27, 1986.

The disclosed device includes, as re-illustrated here in FIG. 1 of the accompanying drawings, a hot-water passage 1, a cold-water passage 2, and an automatic pressure regulating valve 3 disposed in connection with the water passages 1, 2. The automatic pressure regulating valve 3 is composed of a hot-water side valve element 4 for reducing the primary pressure in the hot-water passage 1, a hot-water side valve seat 5, a cold-water side valve element 6 for reducing the primary pressure in the cold-water passage 2, a cold-water side valve seat 7, a connecting member or means 8 for interconnecting the hot-water side valve element 4 and the cold-water side valve element 6, and a piston 9 movable in response to a differential pressure created between the primary pressure of hot water and the primary pressure of cold water that have been reduced by the respective valve elements 4, 6. When the pressure of hot water or the pressure of cold water changes suddenly, the automatic pressure regulating valve 3 is immediately responsive to a differential pressure thus created so as to balance the secondary pressure of hot water and the secondary pressure of cold water at all times. Hot water and cold water are mixed with each other at a mixing ratio which can be varied by a temperature regulating valve 12 driven by a motor 11 to regulate the final water temperature. Mixing portion or chamber 13 is where hot water and cold water are mixed. Thereafter, the temperature controlled water is discharged through a power-driven flow regulating shutoff valve 14. The final water temperature is detected by a mixed water temperature detecting means or sensor such as a thermistor 15. At the same time, the flow rate of the temperature-controlled water is detected by a flow rate detecting means or sensor 16. Detected values from the respective sensors 15, 16 are delivered to a control means or unit 18 which in turn controls the operation of the motor 11 and the flow regulating shutoff valve 14 until the detected values become equal to the setting values set by a setting means or setter 17.

The known water mixing device however has various drawbacks as follows.

Since the pressure regulating valve 3 and the temperature regulating valve 12 are independent of each other, the water mixing device is large in size and complicated in construction and further induces a large pressure loss and hence is not suitable for an application in which a large flow rate is a major requirement. If the pressure regulating valve 3 is omitted, the pressure of hot and cold water acts directly on the temperature regulating valve 12. As the water pressure is variable, an excessively large driving force is necessary to operate the temperature regulating valve 12 without being influenced by the change in water pressure. Furthermore, the response of the motor-driven temperature regulating valve 12 is relatively low and therefore a quick temperature adjusting operation is difficult to achieve. When an electric power supply is interrupted, the motor 11 is brought to a halt and the temperature regulating valve 12 is locked in position. In this instance, if the hot water supply temperature rises or, alternatively, if the cold water supply pressure drops, the final water temperature is elevated to an extent that the user may be damaged by excessively heated water. Additionally, manual operation of the known water mixing device is difficult to achieve unless a complicated mechanism is provided.

SUMMARY OF THE INVENTION

With the foregoing drawbacks of the prior art in view, it is an object of the present invention to provide a hot-water and cold-water mixing device which is compact in size, simple in construction, and highly reliable and safe in operation.

In brief, a hot-water and cold-water mixing device of the present invention includes a balancing valve having a hot-water side valve element and a cold-water side valve element, and a variable balancing means for changing the valve position to thereby vary the flow ratio between hot water and cold water. In other words, the secondary pressure of hot and cold water can be varied by a biasing means so that the hot water-to-cold water flow ratio is changed to regulate the final water temperature. The balancing valve thus constructed has the function of a pressure regulating valve and the function of a temperature regulating valve.

More particularly, according to the present invention, there is provided a hot-water and cold-water mixing device comprising: (a) a hot-water passage and a cold-water passage; (b) a hot-water side valve element for reducing the primary pressure in the hot-water passage, and a cold-water side valve element for reducing the primary pressure in the cold-water passage; (c) connecting means for transmitting a differential pressure created between the secondary pressure of hot water acting on the hot-water side valve element and the secondary pressure of cold water acting on the cold-water side valve element; (d) variable biasing means for producing a variable biasing force acting on the differential pressure acting on the connecting means; (e) a mixing portion for permitting hot and cold water to blend together; and (f) hot-water side flow resistance means disposed between a secondary side of the hot-water side valve element and the mixing portion, and cold-water side flow resistance means disposed between a secondary side of the cold-water side valve element and the mixing portion.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENT

Figure 1:
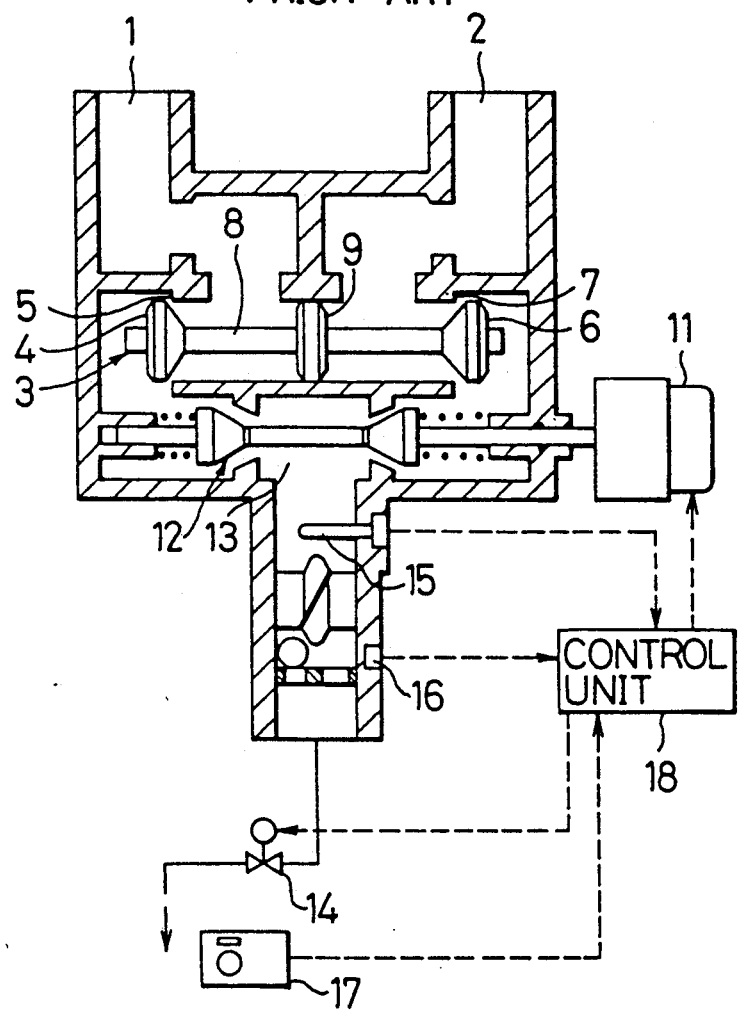
FIG. 1 is a diagrammatical cross-sectional view of a conventional water mixing device.
Figure 2:
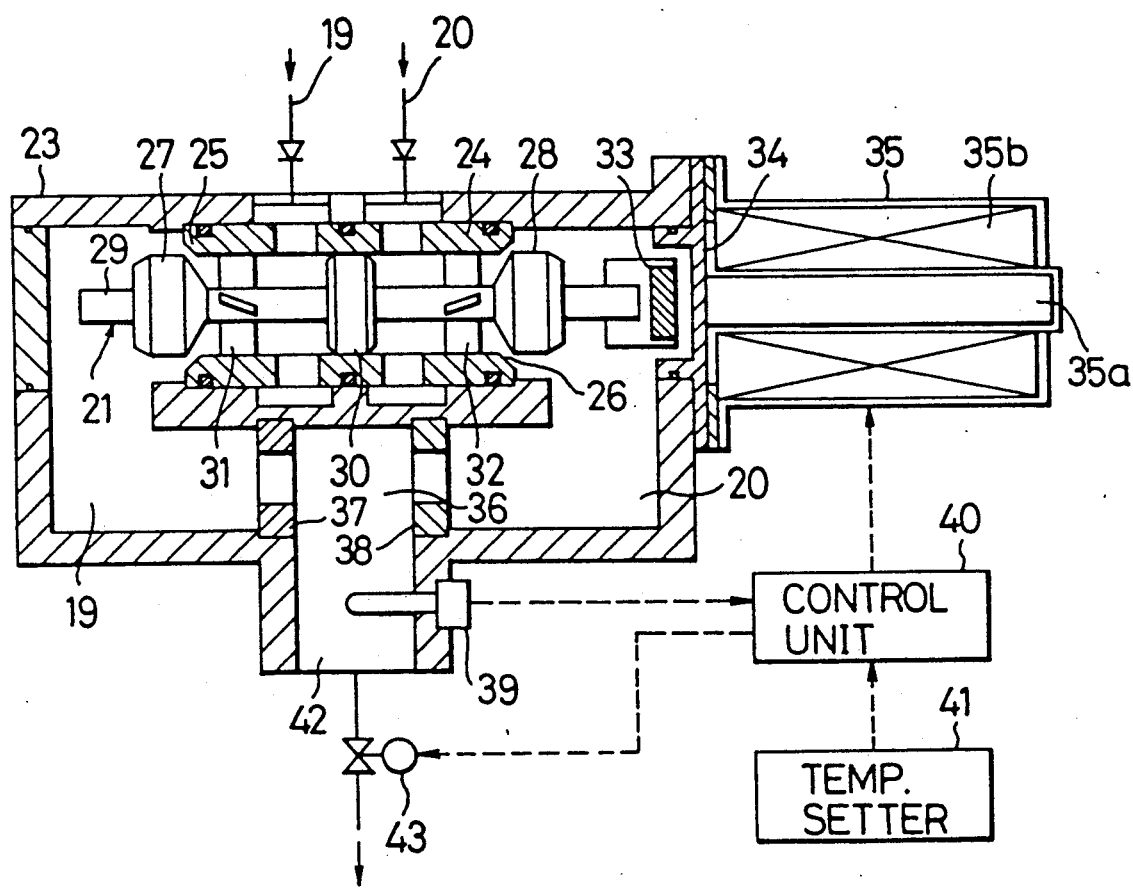
FIG. 2 is a diagrammatical cross-sectional view of a water mixing device according to a first embodiment of the present invention.

Referring to the drawings, wherein like reference characters designate like or corresponding parts throughout the several views, and more particularly to FIG. 2, there is shown a hot-water and cold-water mixing device according to a first embodiment of the present invention.

The water mixing device includes a hot-water passage 19 and a cold-water passage 20 connected to a valve housing 23 via check valves (not designated) respectively, for the passage therethrough of hot water and cold water, the hot and cold water passages 19, 20 further extending into the valve housing 23. A mixing valve (pressure regulating valve) 21 is disposed across the hot and cold water passages 19, 20 within the valve housing 23. The mixing valve 21 is disposed adjacent to a cylinder 24 mounted in the valve housing 23 and defining part of the hot and cold water passages 19, 20. The cylinder 24 has on its opposite end faces a hot-water side valve seat 25 and a cold-water side valve seat 26 which are spaced from a hot-water side valve element 27 and a cold-water side valve element 28 of the mixing valve 21 for reducing the primary pressure of hot and cold water. The hot-water side valve element 27 and the cold-water side valve element 28 are connected together by a connecting means 29. The connecting means comprises a common shaft 29 on which the valve elements 27, 28 are mounted in spaced apart relation to one another in the axial direction of the common shaft 29. A piston 30 is mounted on the common shaft 29 and disposed centrally between the valve elements 27 to separate the hot-water passage 19 and the cold-water passage 20.

The common shaft 29 is provided with a pair of turbines 31, 32 disposed respectively between the hot-water side valve element 27 and the piston 30 and between the piston 30 and the cold-water side valve element 28. The turbines 31 each have a plurality of skewed turbine blades and constitute a rotating means responsive to the water flow for rotating the common shaft 29 about its own axis. The common shaft 29 is connected at its one end to a permanent magnet 33 which is selectively attracted and repelled by a variable biasing means 35 to axially move the common shaft 9 and, therefore, the valve elements 27, 28 and the piston 30 mounted on the common shaft 29. The variable biasing means 35 comprises a solenoid disposed on the outside of the valve housing 23 and separated from the permanent magnet 33 by a partition wall 34.

The hot-water side valve element 27, the cold-water side valve element 28 and the piston 30 have substantially a comparable pressure-receiving area and hence they are capable of canceling out or balancing the primary pressure of hot water and the primary pressure of cold water. Accordingly, when the variable biasing means 35 is in the inoperative stop state and hence does not exert a biasing force on the permanent magnet 33, the secondary pressure of hot water and the secondary pressure of cold water become equal. When the variable biasing means 35 operates to exert a biasing force on the permanent magnet 33, the valve elements 27, 28 move in a same direction so that the secondary pressure on one side differs from the secondary pressure on the opposite side by a value which is equivalent to a value obtained by dividing the biasing force by the pressure-receiving area. On the downstream sides of the respective valve elements 27, 28, the hot-water passage 19 and the cold-water passage 20 join together at a mixing portion or chamber 36 via fixed or stationary orifices 37, 38, respectively. The orifices 37, 38 confront together and each serve as a fixed flow resistance means for opposing the flow of water passing therethrough. The areas available to the flows of hot water and cold water are contracted as these flow pass respectively through the orifices 37, 38 and then impinge together. The orifices 37, 38 thus provided also serve to promote the mixing of hot and cold water, thereby improving the control response characteristics of the mixing device.

A mixed-water temperature detecting means or sensor 39 such as a thermistor is disposed downstream of the mixing portion 36 for detecting the temperature of water flowing from the mixing portion 36 toward a mixed-water passage 42. The mixed-water temperature sensor 39 delivers a signal representing the detected mixed-water temperature to a control means or unit 40. The control unit 40 controls the operation of the variable basing means 35 until the detected mixing-water temperatures is in equal to a setting temperature set by a temperature setting means or setter 41. The mixed-water passage 42 has a downstream end connected to a flow regulating shutoff valve 43 which in turn regulates the flow rate of mixed-water and also controls start and stop modes of the mixed-water supply operation.

The water mixing device of the foregoing construction operates as follows.

When the temperature setter 41 is operated to set a desired water temperature, the flow regulating shutoff valve 43 is operated to open, thereby permitting hot and cold water to flow through the water mixing device. Hot water and cold water flow respectively through the hot- and cold-water passages 19, 20 into the cylinder 24 and then they pass through the respective valve elements 27, 28. In this instance, the water pressure on one side of the cylinder becomes greater than the water pressure on the opposite side by a value equivalent to a biasing force exerted on the valve elements 27, 28 by the variable biasing means 35. For example, when the variable biasing means 35 attracts the permanent magnet 34 to shift the valve elements 27, 28 rightward in FIG. 2, the pressure of cold water increases by a value corresponding to a value obtained by dividing an attracting force by a pressure-receiving area of the piston 30 or the valve elements 27, 28. Alternatively when the variable biasing means 35 exerts a repelling force on the permanent magnet 33 to thereby shift the valve elements 27, 28 leftward in FIG. 2, the pressure of hot water rises by a value equivalent to a value obtained by dividing the repelling force by the pressure-receiving area. With this pressure rise, a differential pressure is created between the opposite sides of the cylinder 24. The differential pressure thus created and the flow resistances provided by the orifices 37, 38 jointly control proportions of hot and cold water (namely, the hot water-to-cold water mixing ratio).

The orifices 37, 38 further promote mutual combination or mixing of hot and cold water. When the final water temperature detected by the mixed-water temperature sensor 39 is not in equal to the setting temperature preset by the temperature setter 41, the variable biasing means 35 is operated to change the biasing force for varying the water mixing ratio until the setting temperature is obtained. Hot and cold water as they flow through the cylinder 24 act on the turbines 31, 32 to rotate them so that the common shaft 29 and all components 27, 28, 30, 33 mounted thereon are rotated as a single unit. With the components 27-33 thus rotated, scale-forming components contained in hot and cold water are unlikely to adhere on the respective component, and the piston 30 is able to slide within the cylinder 24 with a small friction force.

When another tap or faucet is used during the use of the water mixing device, the pressure of hot water or the pressure of cold water fluctuates abruptly. In this instance, however, the mixing valve 21 operates as an automatic pressure regulating valve to maintain the secondary pressure in the condition before the fluctuation of water pressure takes place. As a result, the mixed-water temperature can be maintained without substantial changes. Furthermore, when the flow rate is changed, the difference in secondary pressure is maintained constantly with the result that the fluctuation of the mixed-water temperature is vary small.

In the case where mixed water is to be discharged at a low temperature such as 30° C. or 35° C., the conventional pressure regulating valve regulates the secondary pressure until it becomes equal to the pressure of hot water which is lower than the pressure of cold water. With this regulating operation, the total flow rate of mixed-water is substantially restricted. According to the water mixing device of the present invention, it is possible to increase the total water flow rate by activating the variable biasing means 35 in such a manner that the pressure of the cold-water side exceeds the pressure of the hot-water side by a value corresponding to the value obtained by dividing the biasing force of the variable biasing means 35 by the effective pressure-receiving surface of the valve elements 27, 28 and the piston 30.

The variable biasing means composed of a solenoid 35 includes a stationary iron core 35a and a watertight and electrically insulated coil 35b wound around the iron core 35a, the coil 35b being connected to the control unit 40. When the control unit 40 sends current through the coil 35b, the coil 35b produces a magnetic field passing longitudinally through the iron core 35a according to the Fleming's rule, thereby magnetizing the iron core 35a. The iron core 35a thus magnetized acts on the permanent magnet 34 connected to the common shaft (connecting means) 29 and exerts a biasing force tending to move the common shaft 29 longitudinally. With this longitudinal movement of the common shaft 29, the mixing valve 21 is automatically held in a balanced condition at a position which is shifted to such an extent equivalent to the magnitude of the biasing force produced by the variable biasing means 35. Thus, the balancing point can be varied by changing the magnitude of current supplied to the coil 35b of the variable biasing means 35.

Figure 3:
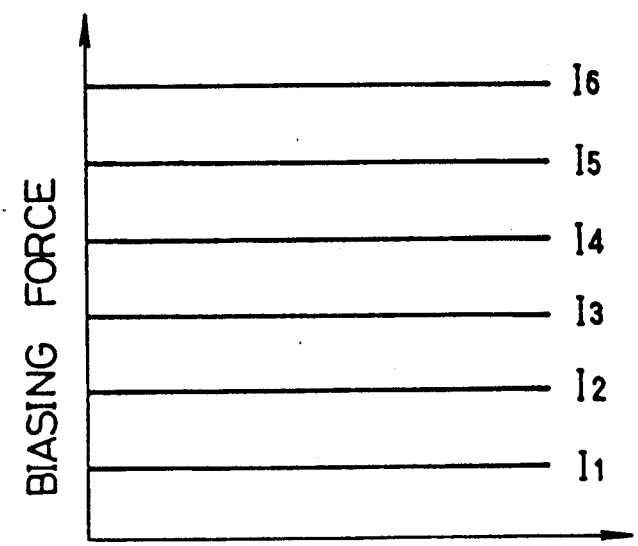
FIG. 3 is a graph showing the bias characteristics of the water mixing device shown in FIG. 2.

In order to perform an accurate pressure regulating operation at the time when the water pressure fluctuates, the mixing valve needs to have the biasing characteristics shown in FIG. 3. The biasing force is independent of the piston position and is variable stepwise with the magnitude of current I supplied to the coil 35b. The variable biasing means 35 may include various mechanisms such as a linear motor other than the solenoid as specified above.

As shown in FIG. 2, the flow resistance means in the form of two confronting orifices 37, 38 are disposed on opposite sides of the mixing portion 36 so that the mixing of hot and cold water is promoted. The flow resistance means also serves as a mixing promotion means and, therefore, a separate mixing promotion means is no longer necessary. An additional advantage realized by provision of the orifices 37, 38 is that the mixing of hot and cold water requires only a short mixing region or portion 36 and hence can be achieved in immediate response to a control command issued from the control unit 40. Although the flow resistance means in the illustrated embodiment comprises an orifice 37, 38 provided on each of the hot-water side and the cold-water side, it is possible to constitute such flow resistance means solely by the hot-water passage 19 and the cold-water passage 20 provided on the secondary side of the valve elements 27, 28.

Figure 4:
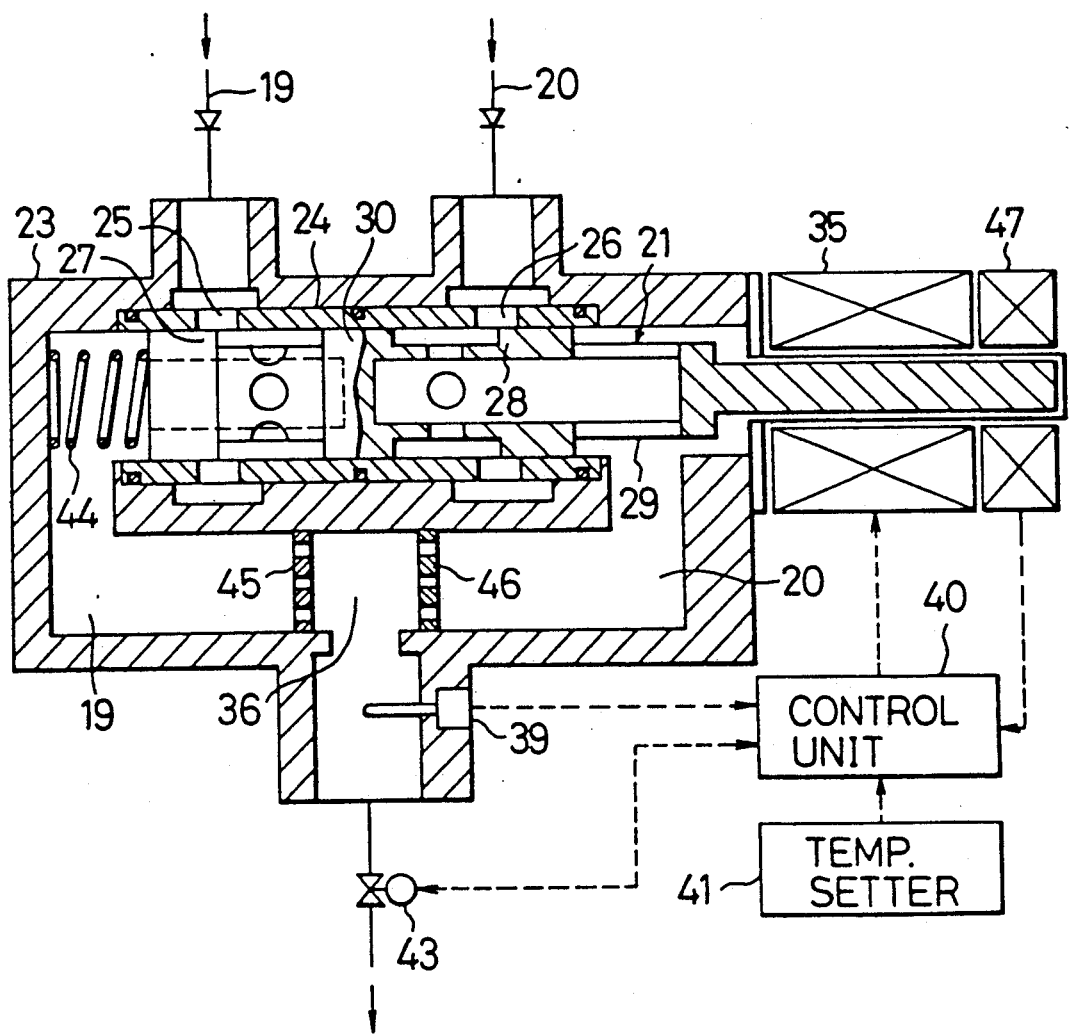
FIG. 4 is a view similar to FIG. 2, but showing a water mixing device according to a second embodiment.

FIG. 4 shows a water mixing device which is similar to the water mixing device shown in FIG. 2 but differs therefrom in the structure of the automatic pressure regulating valve 21. Furthermore, a variable biasing means 35 is so constructed as to exert an biasing force tending to move a connecting means 29 leftward in FIG. 4 against the force of a compression coil spring 44. A pair of confronting, perforated mixing promotion plates 45, 46 is disposed on opposite sides of a mixing portion 36. The mixing promotion plates 45, 46 concurrently serve as a flow resistance means as in the case of the orifices 37, 38 shown in FIG. 2. The variable biasing means 35 is combined with a linear variable-differential transformer 47 which is provided for detecting the valve position of the automatic pressure regulating valve 21.

The mixing device of the foregoing construction operates substantially in the same manner as done by the mixing device shown in FIG. 2 and hence a description is no longer necessary.

Figure 5:
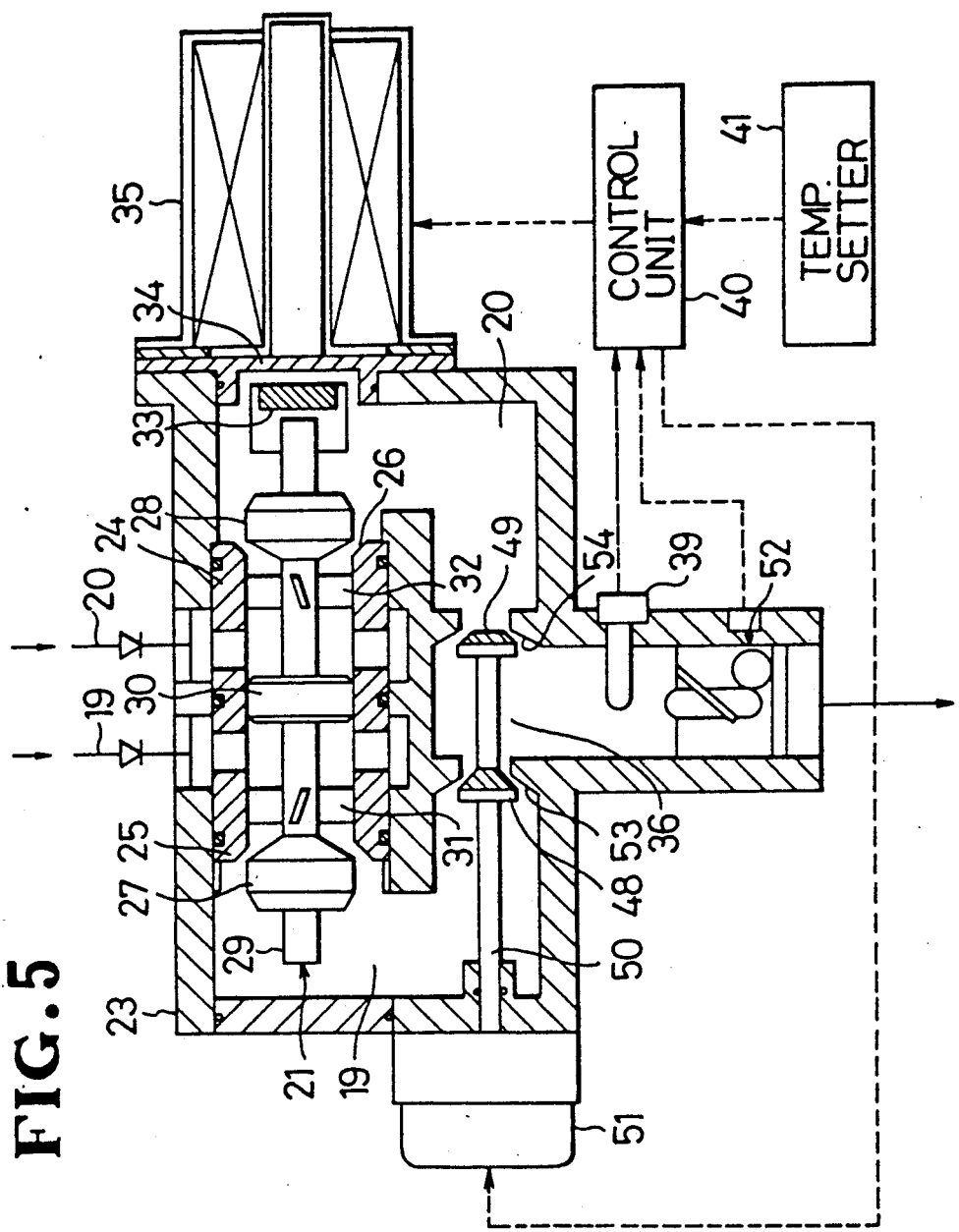
FIG. 5 is a diagrammatical cross-sectional view of a water mixing device according a third embodiment, the device incorporating a flow resistance means disposed between each valve element and a mixing portion for providing a flow resistance variable with the flow rate of supply water.

FIG. 5 illustrates a third embodiment of the present invention. This embodiment is different to the first embodiment shown in FIG. 2 in that a variable flow resistance means is disposed between a corresponding valve element 27 or 28 and a mixing portion 36 for varying the resistance in direct proportion to the flow rate of supplied hot and cold water. The variable flow resistance means comprises a hot water flow resistance means 48 disposed at a junction between a how-water passage 19 and the mixing portion 36, and a cold water flow resistance means 49 disposed at a junction between a cold-water passage 20 and the mixing portion 36. Both flow resistance means 48, 49 comprise two valve elements mounted on a common drive shaft 50 which is driven by a motor 51 via a speed reducer and a motion translating mechanism (neither designated).

The flow resistance means 48, 49 are disposed in confrontation to the mixing portion 36 so as to produce certain resistances to the flow of hot and cold water and concurrently contract the water flow. Hot water and cold water thus contracted then impinge together and are mutually mixed up with each other at the mixing portion 36. Thus, the flow resistance means 48, 49 also serve as mixing promotion means. The variable flow resistance means 48, 49 thus provided are advantageous over the fixed flow resistance means 37, 38 shown in FIG. 2, for reasons described below. When the flow rate of hot and cold water reduces, the fixed flow resistance means 37, 38 produce small pressure losses. In this condition, the hot water-to-cold water mixing ratio is readily influenced by the accuracy of the biasing force exerted by the variable biasing means 35 with the result that the temperature regulating accuracy and the transient temperature fluctuation are deteriorated. The variable flow resistance means 48, 49, as against the fixed flow resistance means 37, 38, are capable of providing variable flow resistances so that the hot water-to-cold water mixing ratio is independent of the accuracy of the variable biasing force regulation and the accuracy of the pressure balance even when the flow rate of hot and cold water is reduced.

When a temperature setter 41 shown in FIG. 5 is operated to set a desired final water temperature, the hot water flow resistance means 48 and the cold water flow resistance means 49 are shifted leftward in the same figure to thereby permit hot and cold water to be mixed up and then to flow from the water mixing device. In this instance, the proportions of hot and cold water being mixed and, therefore, the final water temperature obtained are determined depending on resistance values of the respective flow resistance means 48, 49. The resistance values of the respective flow resistance means 48, 49 may be varied linearly but, in general, they are changed stepwise for easiness of their control. The regulation of the flow rate of hot and cold water is achieved under the control of a feedback signal delivered from a flow rate detecting means or sensor 52 disposed downstream of the mixing portion 36.

When the water supply is to be interrupted, the flow resistance means 48, 49 are displaced rightward in FIG. 5 until they seat on corresponding valve seats 53, 53 formed on portions of the valve housing 23.

As described above, the variable flow resistance means 48, 49 are capable of regulating the flow rate of hot and cold water without the necessity of a separate flow control valve or a stop valve. The water mixing device having such variable flow resistance means 48, 49 is reliably operable even at a low flow rate. In the illustrated embodiment, the flow resistance means 48, 49 are driven by a single drive means including one motor 51, however, it is possible to provide a drive means for each of the flow resistant means 48, 49. Further, an additional stop valve may be provided for stopping the final water supply, in which instance the variable flow resistance means 48, 49 serve as flow control valves. The flow control may be achieved by regulating the opening of each flow resistance means.

Figure 6:
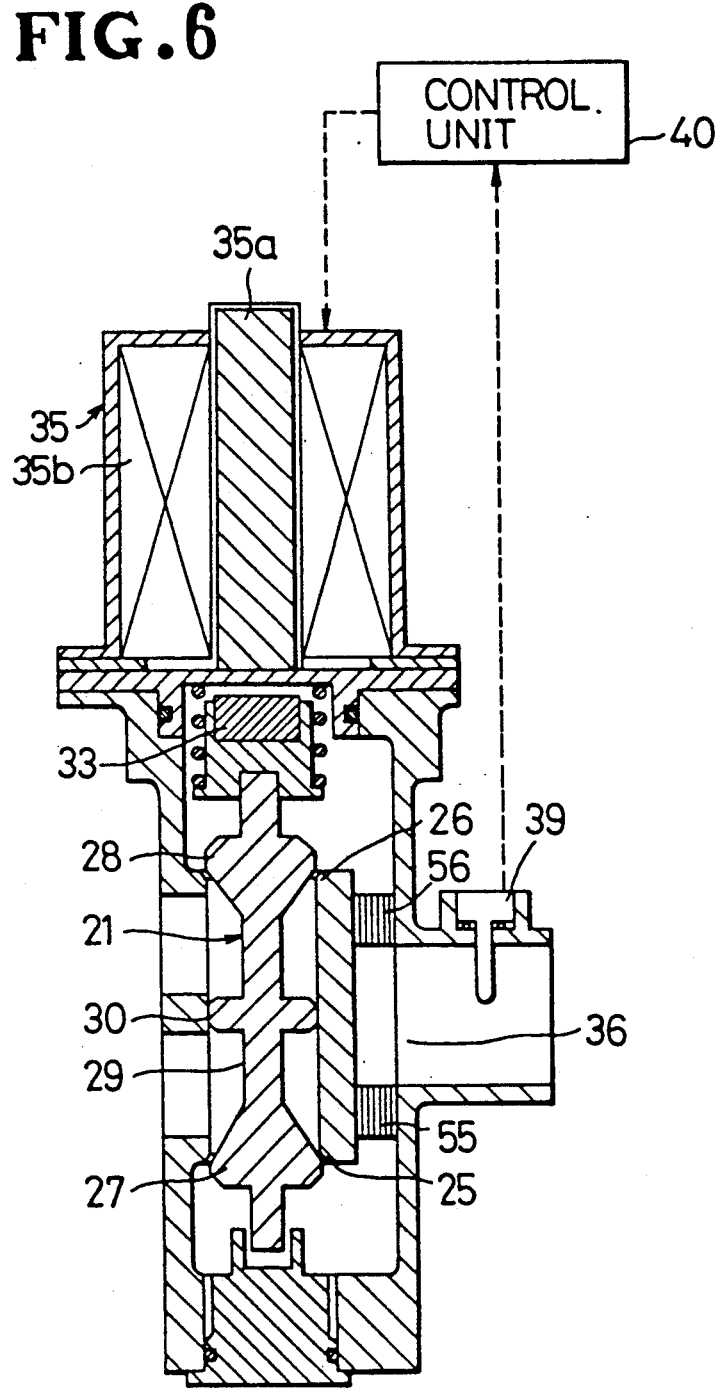
FIG. 6 is a view similar to FIG. 5, but showing a water mixing device according to a fourth embodiment including a linear flow resistance means.

FIG. 6 shows a water mixing device according to a fourth embodiment of the present invention. The water mixing device includes a linear flow resistance means disposed between each valve element 27, 28 and a mixing portion 36 for restricting the flow rate of water in substantially direct proportional to the differential pressure created between the valve elements 27, 28.

Figure 7:
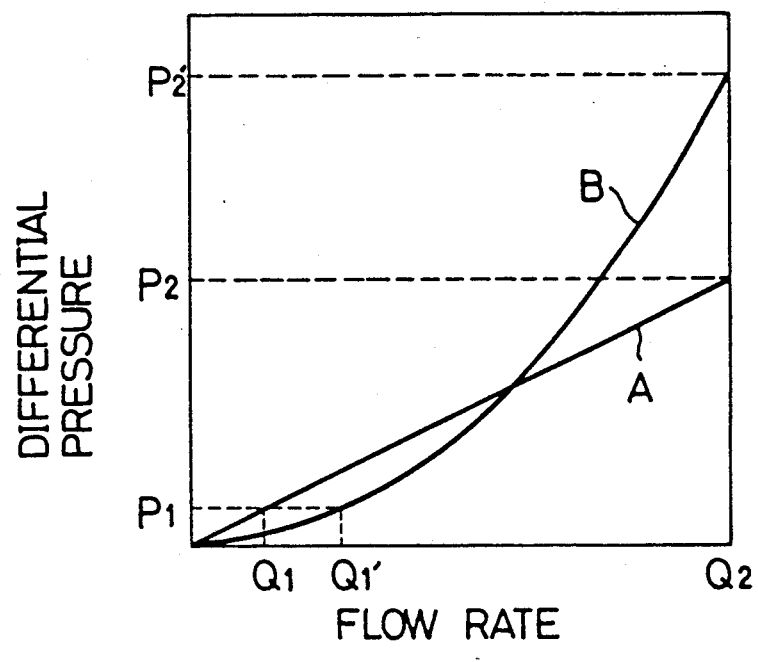
FIG. 7 is a graph showing the characteristics of the linear flow resistance means shown in FIG. 6.
Figure 8:
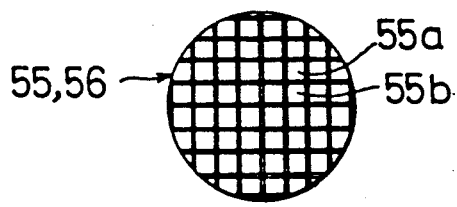
FIG. 8 is a schematic view showing the construction of the linear flow resistance means.

Hot water and cold water passing respectively through the hot-water side valve element 27 and the cold-water side valve element 28 flow through a hot-water side linear flow resistance means 55 and a cold-water side linear flow resistance means 56 and then they are mixed together at the mixing portion 36. The linear flow resistance means 55, 56 serve to vary the flow rate of water passing therethrough, in direct proportion to the differential pressure created between the hot-water side valve element 27 and the cold-water side valve element 28, as shown in FIG. 7. The linear flow resistance means 55, 56 each comprise a reticular element having a multitude of fine openings or channels 55a, 55b, as shown in FIG. 8.

Under optimum conditions, the final water temperature is not variable with the pressure and flow rate of water. However, in the automatic pressure regulating valve 21, the final water temperature may be varied by a pressure regulating error caused either by dimensional errors associated with the valve elements 27, 28 and a piston 30 due to the working tolerance, or by the resolution power and repeatability of the variable biasing means 35. In order to reduce fluctuations in the final water temperature, the differential pressure created by the linear flow resistance means 55, 56 must exceed a certain level. FIG. 7 illustrates differential pressure versus flow rate characteristic curves of the linear flow resistance means 55, 56 and orifices of the general construction. In the case of the linear flow resistance means 55, 56 indicated by the straight line A, when the required controlling minimum differential pressure is P1, the controllable minimum flow rate is Q1, and when the maximum flow rate required by the user is Q2, the differential pressure is P2. On the other hand, in the case of the orifices indicated by the curved line B, when the required controlling minimum differential pressure is P1, the controllable minimum flow rate is Q1', and when the maximum flow rate is Q2, the differential pressure is P2'. As appears clear from the foregoing, the linear flow resistance means 55, 56 are advantageous over the orifices for their small controllable minimum flow rate as well as a small differential pressure produced at the maximum flow rate. It is therefore possible to reduce the pressure loss created in the respective water passages 19, 20 and also lower the maximum driving force necessary for actuating the variable biasing means 35.

Figure 9:
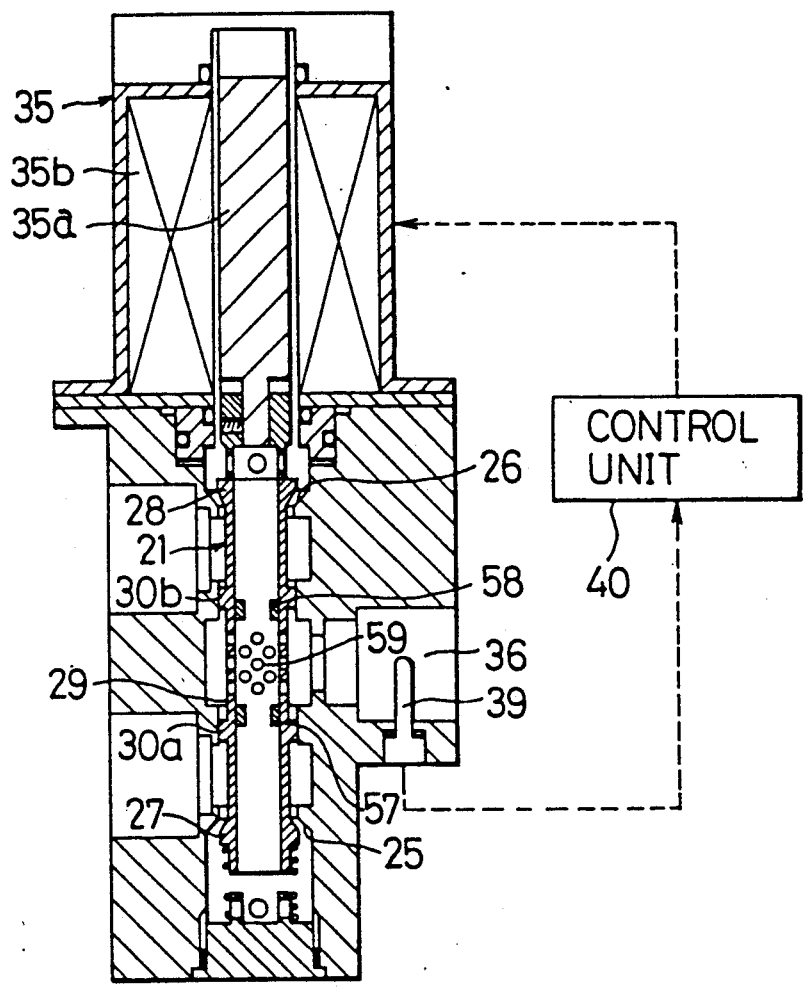
FIG. 9 is a diagrammatical cross-sectional view of a water mixing device according to a fifth embodiment, the device including a differential pressure generating means movable in unison with a connecting means interconnecting a hot-water side valve element and a cold-water side valve element.

FIG. 9 shows a water mixing device according to a fifth embodiment of the present invention. The water mixing device differs from the mixing devices of the foregoing embodiments in that a differential pressure generating means is movable in unison with a connecting means, as described below.

In the device per FIG. 9, hot water and cold water pass respectively through a hot water valve element 27 and a cold water valve element 28 flow through a hot-water side differential pressure generating member 57 and a cold-water side differential pressure generating member 58, and thereafter are blended together at a mixing portion 36. The differential pressure generating members 57, 58, which constitute the differential pressure generating means stated above, are disposed within a hollow connecting means 29 at an intermediate portion thereof and movable in unison with the connecting means 29. The connecting means 29 has a number of small holes or perforations 59 disposed between the differential pressure generating members 57, 58 and the mixing portion 36 for assisting uniform mixing of hot and cold water.

When hot water flows through the differential pressure generating member 57, the differential pressure generating means 57 generates a differential pressure proportional to the flow rate. The differential pressure thus generated acts on the connecting means 29 and moves the connecting means 29 downward in FIG. 9. Similarly, the differential pressure generating member 58 on the cold-water side generates a differential pressure which tends to move the connecting means 29 upward in FIG. 9 against the differential pressure on the hot-water side. Designated by 30a and 30b are a hot-water side piston and a cold-water side piston, respectively.

Since the differential pressure generating members 57, 58 are integral with the connecting means 29, the number of structural components of the water mixing device can be reduced.

Figure 10:
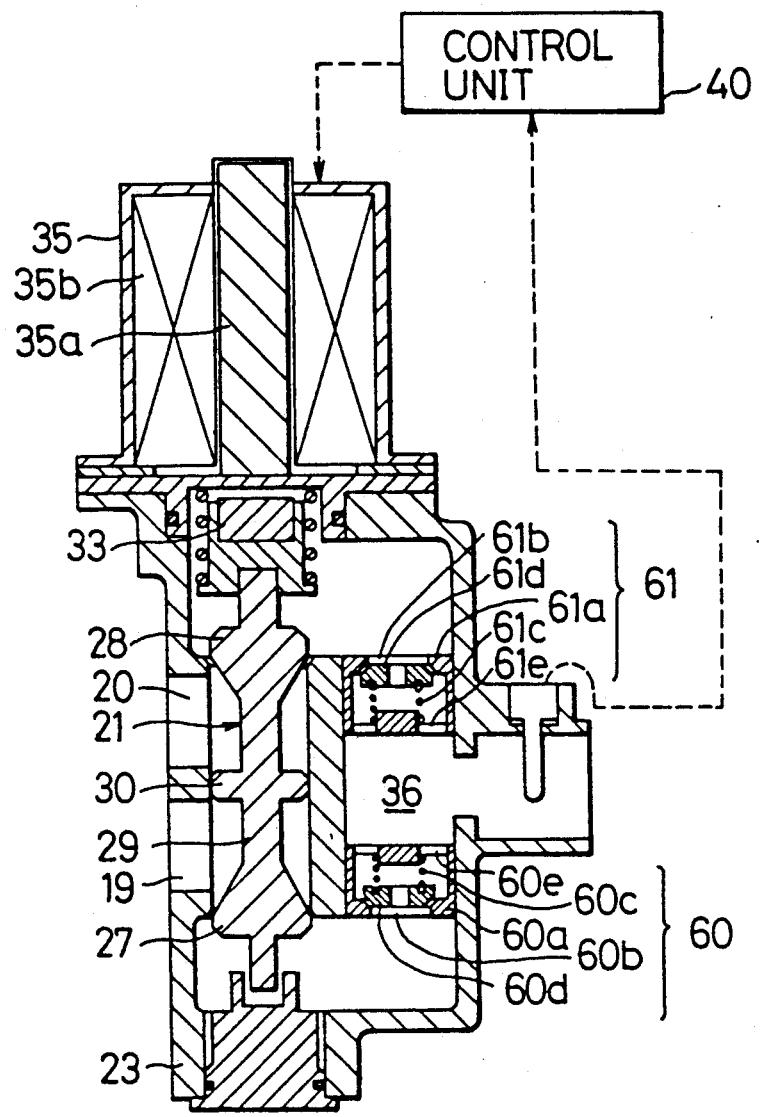
FIG. 10 is a diagrammatical cross-sectional view of a water mixing device according to a sixth embodiment including a variable throttle disposed between each valve element and a mixing part.

FIG. 10 illustrates a water mixing device according to a sixth embodiment of the present invention. The water mixing device is characterized by the provision of a variable throttle disposed between each valve element and a mixing portion for changing the opening according to the flow rate.

In FIG. 10, hot water and cold water passed respectively through a hot water valve element 27 and a cold water valve element 28 flow through a hot-water side variable throttle 60 and a cold-water side variable throttle 61 and then they are mixed with each other at a mixing portion 36. Each of the variable throttles 60, 61 includes a fixed valve seat 60a, 61a having a valve hole 60b, 61b and a ring-shaped movable valve element 60d, 61d urged by a spring 60c, 61c against the fixed valve seat 60a, 61a to close a substantial part of the valve hole 60b, 61b. The fixed valve seat 60a, 61a further has a plurality of circumferentially spaced small holes or perforations 60e, 61e facing the mixing portion 36 for promoting uniform mixing of hot and cold water. When hot water flows through the variable throttle 60, a differential pressure is created between opposite sides of the movable valve element 60d. When a force corresponding to the differential pressure exceeds the force of the spring 60c, the movable valve element 60d is separated from the valve seat 60a, thereby completely opening the valve opening 60b. The opening area of the variable throttle 60 is determined by the flow rate of hot water flowing through the throttle 60. Consequently, by properly setting the force of the spring 60c, 61c, the throttles 60, 61 may have operation characteristics which realize a differential pressure versus flow rate characteristic curve A shown in FIG. 11.

As appears clear from the characteristic curve A, when the differential pressure necessary for the controlling purpose is P1, then the controllable minimum flow rate on each of the hot-water side and the cold-water side is Q1. On the other hand, when the user needs a maximum flow rate Q2, the differential pressure created at that time is P2. In case where orifices of the general construction are used in place of the variable throttles 60, 61, as indicated by a characteristic curve B in FIG. 11, when the necessary controlling differential pressure is P1 (i.e., identical to that of the variable throttles 60, 61), the controllable minimum flow rate is Q1'. On the other hand, a differential pressure P2' is created at the maximum flow rate Q2. This means that the variable throttles 60, 61 enable a reliable operation of the water mixing device even at a lower flow rate, and with a substantially reduction of differential pressure at the maximum flow rate. Consequently, the pressure losses in the respective water passages can be reduced and the maximum driving force necessary for activating a variable biasing means 35 (variable magnetic force generating means) can be lowered.

Figure 12:
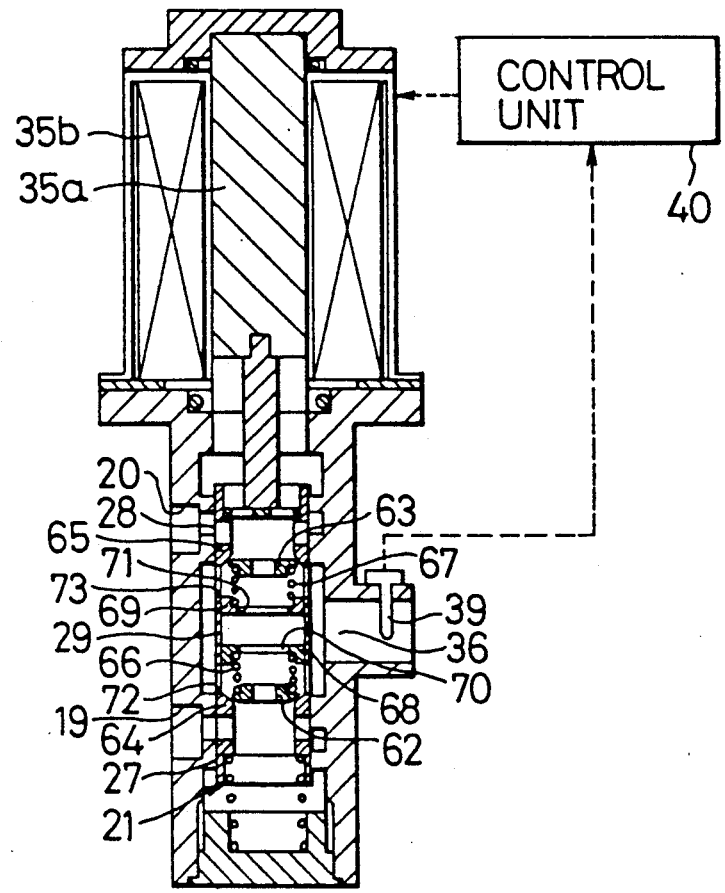
FIG. 12 is a diagrammatical cross-sectional view of a water mixing device according to a seventh embodiment including two variable throttles integral with hot- and cold-water side valve elements, respectively.

FIG. 12 shows a water mixing device according to a seventh embodiment of the present invention. The water mixing device is similar to the water mixing device shown in FIG. 10 but differs therefrom in that variable throttles are integral with corresponding valve elements, as described below.

An automatic pressure regulating valve 21 of the water mixing device is of a hollow structure and the variable throttles are disposed within the hollow pressure regulating valve 21. The variable throttles includes a pair of ring-shaped movable valve elements 62, 63 urged respectively against a pair of valve seats 64, 65 by means of a pair of springs 66, 67 to restrict flow communication between hot-water and cold-water passages 19, 20 and a mixing portion 36 through the hollow pressure regulating valve 21. The valve seats 64, 65 are formed integrally with hot-water and cold-water side valve elements 27, 28. With this construction, when hot water flows through the movable valve element 62, a differential pressure is created between opposite sides of the movable valve element 62. When the differential pressure exceeds the force of the spring 66, the movable valve element 62 is separated from the fixed valve seat 64, thereby allowing hot water to freely flow through the variable throttle. The opening of the variable throttle is set to vary with the flow rate of hot water passing therethrough, so that by properly setting the force of the spring 66, the variable throttle can possess operation characteristics which realize the differential pressure versus flow rate characteristic curve A shown in FIG. 11. The same also applies to the cold-water side variable throttle. Hot and cold water passed through the respective movable valve elements 62, 63 are branched into two streams of flow, one flowing through an opening 70, 71 defined in a fixed valve retainer 68, 69, the other flowing through a secondary hole 72, 73 in the valve element 27, 28. Then the branched flow streams of each of hot and cold water are mixed up with each other and, thereafter, hot and cold water are blended together at a mixing portion 36.

Figure 13:
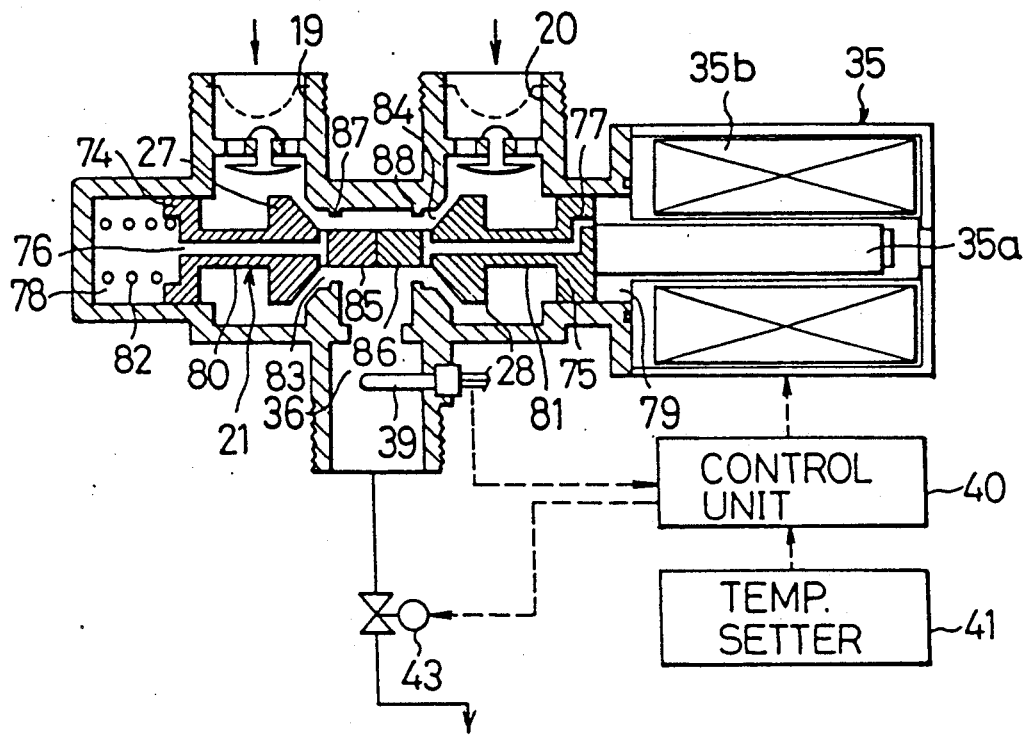
FIG. 13 is a diagrammatical cross-sectional view of a water mixing device according to an eighth embodiment, the device including a balancing means.

FIG. 13 illustrates a water mixing device according to an eighth embodiment of the present invention. This water mixing device is characterized by hot water and cold water passages which are provided on the secondary side of hot- and cold-water side valve elements, extend longitudinally along connecting shafts and are blended together at a central portion of an automatic pressure regulating valve.

The automatic pressure regulating valve 21 includes a hot-water side valve element 27, a cold-water side valve element 28, a hot-water side piston 74 associated with the valve element 27 for canceling out influences of the primary pressure and the secondary pressure exerted on the valve element 27, a cold-water side piston 75 associated with the valve element 28 for canceling out influences of the primary pressure and the secondary pressure exerted on the valve element 28. The pistons 74, 75 serve as a pressure balancing means. Each of the valve elements 27, 28 and a corresponding one of the pistons 74, 75 have a same pressure receiving area so that the primary pressure is taken up between each valve element 27, 28 and the corresponding piston 74, 75, while the secondary pressure is introduced through an axial connecting hole 76, 77 into a back pressure chamber 78, 79 defined behind the corresponding piston 74, 75. With this arrangement, a hot-water side pressure regulating member 80 and a cold-water side pressure regulating member 81 are subjected to a differential pressure created between the secondary pressure of hot water and the secondary pressure of cold water.

The pressure regulating members 80, 81 are structurally independent of each other and jointly constitute a movable part of the automatic pressure regulating valve 21. The hot-water side pressure regulating member 80 is urged rightward in FIG. 13 by a biasing means 82 comprising a compression coil spring, while the cold-water side pressure regulating member 81 is connected to a plunger 35a of a variable biasing means 35. The pressure regulating members 80, 81 are held in a position where a biasing force produced by the variable biasing means 35 is in balance with the biasing force produced by the biasing means 82. By changing the biasing force of the variable biasing means 35, the position of the pressure regulating members 80, 81 can be varied to thereby change the hot water-to-cold water mixing ratio.

A portion 83 of a hot-water passage 19 provided on the secondary side of the hot-water side valve element 27 and a portion 84 of a cold-water passage 20 provided on the secondary side of the cold-water side valve element 28 extend longitudinally along connecting shafts 85, 86 and are blended together at a central portion of the automatic pressure regulating valve 21. Each of the connecting shafts 85, 86 extends from the corresponding valve element 27, 28 toward the opposite valve element 28, 27 and are held in end-to-end contact with each other so as to transmit a differential pressure created between the secondary pressure of hot water and the secondary pressure of cold water.

The water mixing device further has a hot-water side orifice 87 disposed downstream of the valve element 27, and a cold-water side orifice 88 disposed downstream of the valve element 28. The orifices 87, 88 constitute flow resistance means and promote uniform mixing of hot and cold water at a mixing portion 36.

Since the hot-water passage 83 and the cold-water passage 84 are defined longitudinally along the connecting shafts 85, 86, the connecting shafts 85, 86 are used as a mixing portion. This arrangement is effective to simplify the structure of the water mixing device. Furthermore, the portion extending between the two valve elements 27, 28 has a temperature distribution in which hot water, mixed water of a desired temperature, and cold water are arranged in the order named. As a result, the temperature gradient of this portion is not steep but relatively gentle. Such gentle temperature gradient prolongs the service life of the valve elements, lowers the possibility of scale adhesion, and extends the scope of selection of materials eligible for the components of the automatic pressure regulating valve 21.

Figure 14:
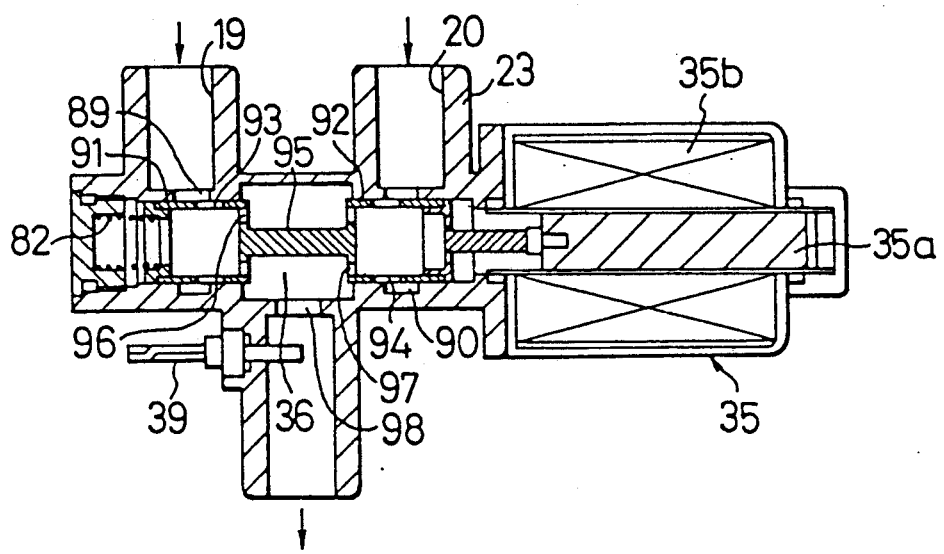
FIG. 14 is a view similar to FIG. 13, but showing a water mixing device according to a ninth embodiment.

FIG. 14 shows a water mixing device according to a ninth embodiment of the present invention which is a modification of the water mixing device of the eighth embodiment shown in FIG. 13.

The water mixing device shown in FIG. 14 is so constructed as to regulate the pressure by adjusting the opening of each of a plurality of circumferentially spaced pressure regulating holes 93, 94 relative to an opening 89, 90 in the corresponding water passage 19, 20. The primary pressure of hot water and the primary pressure of cold water is balanced by an outer peripheral portion of a hot-water side pressure regulating hollow cylinder 91 and an outer peripheral portion of a cold-water side pressure regulating hollow cylinder 92. On the other hand, the pressure equilibrium on the secondary side is achieved by and between inner peripheral portions of the respective pressure regulating cylinders 91, 92. Both pressure regulating cylinders 91, 92 are joined coaxially together by a connecting shaft 95 so that the hot-water and cold-water passages 19, 20 extend longitudinally along the connecting shaft 95 from opposite directions and are blended together at a central portion of the connecting shaft 95. A pair of perforated turbulence plates 96, 97 are connected at opposite ends of the connecting shaft 95 for restricting the flow of hot and cold water and for promoting mixing of hot and cold water. Thus, the turbulence plates 96, 97 concurrently serve as a flow resistance means and a mixing promoting means. The water mixing device of the foregoing construction obviates the need for the provision of separate hot-water passages extending respectively from the corresponding pressure regulating holes 93, 93 to a mixing portion. As a result, a further simplification of structure of the water mixing device can be attained. Other structural and functional details of the water mixing device are substantially the same as those of the water mixing device shown in FIG. 13 and hence a description is no longer necessary.

Since the pressure regulating holes 93, 94 are defined peripherally in a cylinder assembly which is composed of the cylinders 91, 92 and the connecting shaft 95 slidably movable within a valve housing 23, hot and cold water flow along the periphery of the cylinder assembly and then move radially into the cylinder assembly toward a longitudinal axis of the cylinder assembly.

In operation, an exciting current is applied to a coil 35b of a variable biasing means (variable magnetic force generating means) 35 to displace a movable iron core or plunger 35a of the biasing means 35 leftward in FIG. 14 against the force of a biasing means 82 composed of a compression coil spring. When the exciting current is varied to change the position of the plunger, the position of the respective pressure regulating holes 93, 94 relative to the corresponding openings 89, 90 changes, thereby varying proportions of the opening area of the respective pressure regulating holes 93, 94 so as to adjust the final water temperature.

Hot and cold water passed through the corresponding pressure regulating holes 93, 94 flow along outer peripheral surfaces of the cylinders 91, 92 and move radially into the cylinders 91, 92 toward the longitudinal axis of the cylinders 91, 92. Then, hot and cold water as they flow through the perforated turbulence plates 96, 97 involve pressure losses which are equivalent to forces or pressure exerted on the turbulence plates 96, 97. After hot and cold water flow radially into the cylinder assembly, forces exerted on the cylinder assembly by the secondary pressure of hot and cold water, a biasing force exerted by a biasing means 82, and an electromagnetic force exerted on the plunger 35a are balanced together with respect a given exciting current applied to the coil 35b. Thus, the cylinder assembly is positioned in a stable condition. Consequently, the hot water-to-cold water flow ratio can be maintained uniformly even at the occurrence of a sudden pressure change.

With the foregoing construction, the cylinder assembly is operative, as a mixing valve, in such a manner that the primary pressure of hot water and the primary pressure of cold water are canceled out by the outer periphery of the cylinder assembly, and after adjustment of the hot water-to-cold water flow ratio, the secondary pressure of hot water and the secondary pressure of cold water are balanced. Accordingly, mixing of hot and cold water is achieved stably without being influenced by changes in the pressure.

Furthermore, since the perforated turbulence plates 96, 97 are disposed in confrontation, hot and cold water having passed through the respective turbulence plates 96, 97 are urged to collide together. Consequently, a uniform mixing of hot and cold water is promoted. Yet, a mixed-water temperature detecting means or sensor 39 disposed immediately downstream of the orifice 98 enables a stable detection of the mixed-water temperature which will prevent pulsation of the control operation.

Figure 15:
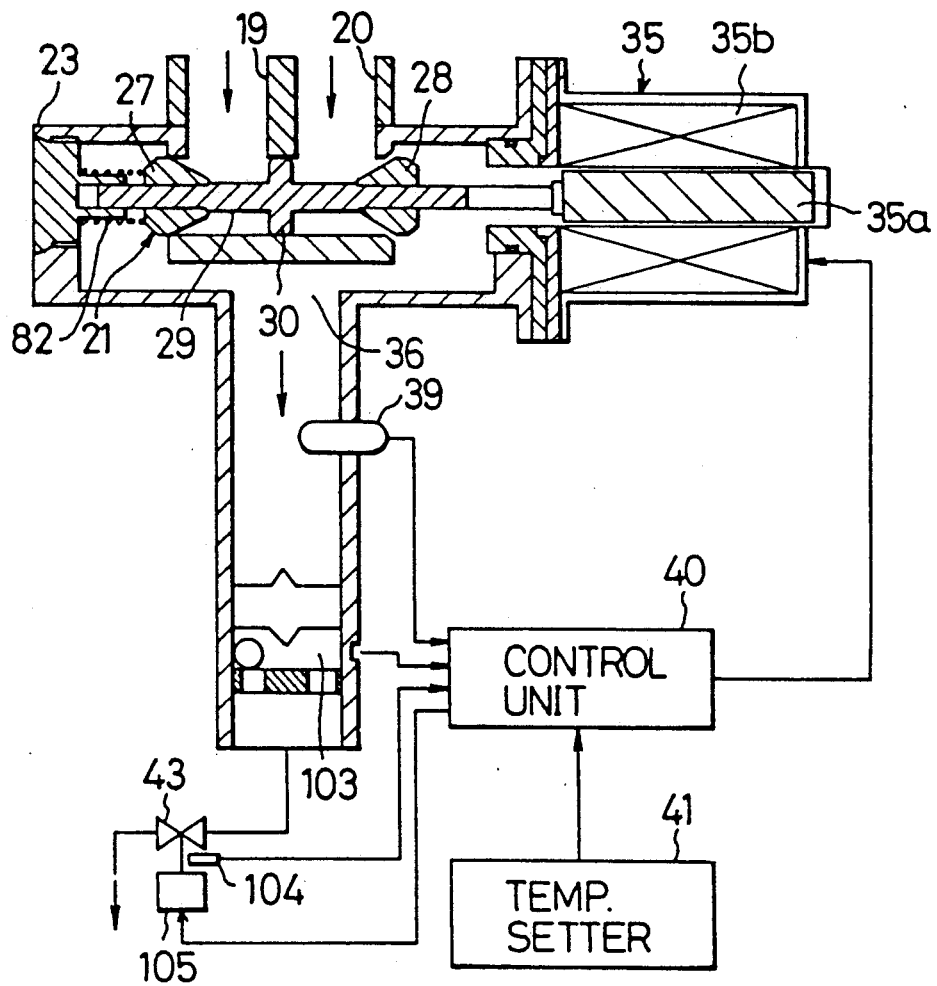
FIG. 15 is a diagrammatical cross-sectional view of a water mixing device according to a tenth embodiment.

FIG. 15 illustrates a water mixing device according to a tenth embodiment of the present invention. The water mixing device includes a biasing means 88 acting on a connecting means 29 to urge the latter in a direction to lower the final water temperature when the biasing force produced by a variable biasing means 35 is reduced.

When a control means or unit 40 issues a command signal to lower an exciting current supplied to a coil 35b of the variable biasing means 35, an electromagnetic force tending to move a movable iron core or plunger 35a leftward in FIG. 15 is reduced. With this reduction of the electromagnetic force, the plunger 35a is displaced rightward in the same figure so that a cold-water side valve element 28 is opened more widely than a hot-water side valve element 27, thereby lowering the final water temperature. In this instance, the biasing means 82 promotes the leftward movement of the plunger 35a. When the power supply is interrupted due to the accidental power failure, the variable biasing means 35 is incapable to produce any biasing force. Then, the biasing means 82 composed of a compression coil spring urges the connecting means 29 rightward until the hot-water side valve element 27 is fully closed and the cold-water side valve element 28 is fully opened. Accordingly, the final water temperature never exceeds a setting temperature even when subjected to a disturbance such as an increase in supply hot water temperature, or fluctuations of pressure. Thus, the water mixing device can operate in safety without the need for an expensive backup power supply.

Figure 16:
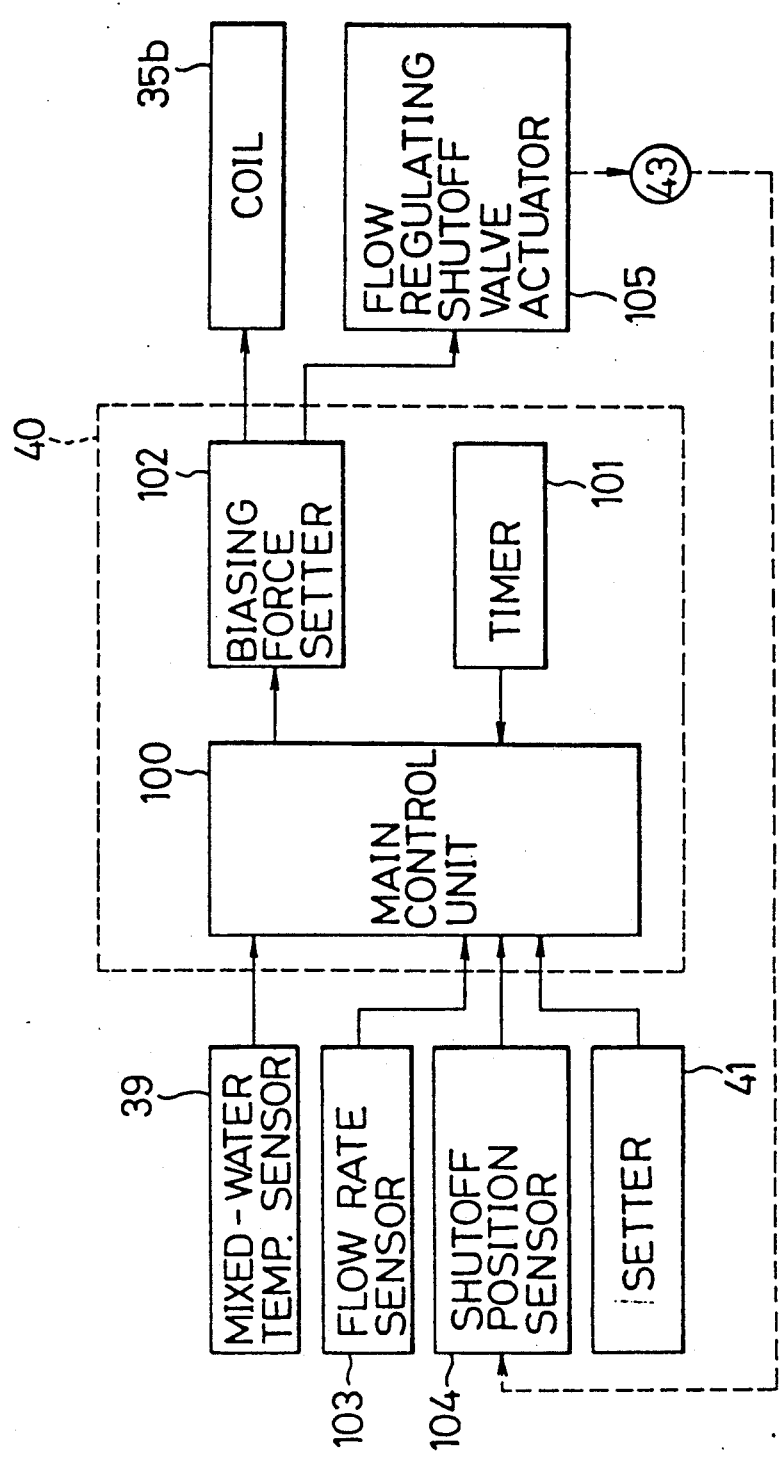
FIG. 16 is a block diagram showing the construction of a typical control unit incorporated in the water mixing device shown in FIG. 15.

FIG. 16 shows the general construction of the control unit 40 associated with the water mixing device of the foregoing embodiment shown in FIG. 15. The control unit 40 includes a main control unit 100, a timer 101 and a biasing force setting means or setter 101.

When the supply of mixed water is to be stopped by a temperature setter 41, or when the supply of mixed water is stopped due to the failure of water supply, a flow rate detection means or sensor 103 detects a reduction of flow rate of water and sends a detected signal to the main control unit 100. Then, the flow rate falls below a predetermined level whereupon control of the mixed water temperature to approximate a setting temperature becomes difficult to achieve. The main control unit 100 sends a command signal to enable the biasing force setter 102 to stop application of an exciting current to the coil 35b of the variable biasing means 35 (FIG. 15), thereby saving power consumption of the water mixing device. Upon de-energization of the coil 35b, the biasing means 88 urges the connecting means 29 in a direction to substantially fully close the hot-water side valve element 27. Consequently, even when the flow regulating shutoff valve 43 is opened accidentally, the final water temperature is kept at a level lower than the setting temperature. Furthermore, interruption of the supply of mixed water can be detected reliably because a mixed-water supply interruption detection means or sensor is composed of the flow rate sensor 103 which detects the flow rate of mixed water directly.

A description will not be provided of a mode of operation in which the timer 101 is employed to stop the supply of mixed-water. When the supply of mixed water is to be stopped by a setter 41, or when the supply of mixed water is stopped due to the failure of water supply, a flow rate detection means or sensor 103 detects a reduction of flow rate of water and sends a detected signal to the main control unit 100. Then, the flow rate drops below a predetermined level whereupon control of the mixed water temperature to approximate a setting temperature becomes difficult to achieve. The main control unit 100 sends a command signal to activate the biasing force setter 102 in such a manner as to maintain a constant supply of exciting current to the coil 35b of the variable biasing means 35 (FIG. 15), thereby locking the connecting means 29 in position against displacement. At the same time, the main control unit 100 issues a command signal to start operation of the timer 101. When a preset time period elapses, the timer 101 outputs a signal to the main control unit 100 which in turn delivers a command signal to enable the biasing force setter 102 to stop application of exciting current to the coil 35b. In this instance, the timer 101 is reset.

As appears clear from the foregoing description, application of exciting current to the coil 35b is terminated when a predetermined period of time set by the timer 101 elapses. This provides a substantial power saving. In the case where the supply of mixed water is interrupted periodically at intervals of time which are shorter than the preset time period of the timer 101, the connecting means 29 is latched in a position to ensure supply of mixed-water at a temperature set by the preceding operation. The final water temperature at the next mixed-water supply operation is stable, accordingly.

The mixed-water supply interruption detection means may comprise a shutoff position detection means or sensor 104 as described later. When the flow regulating shutoff valve 43 is fully closed, the shutoff position sensor 104 detects the full closed position of the flow regulating shutoff valve 43 and sends a detected signal to the main control unit 100. Then, the main control unit 100 activates the biasing force setter 102 to terminate energization of the coil 35. Advantageous effects attained by this arrangement are the same as those attained by the foregoing arrangement in which the flow rate sensor 103 is employed. An additional advantage associated with the shutoff position sensor 104 is that an interruption of the mixed-water supply can be detected economically and reliably.

The mixed-water supply interruption detection means may include a setting means or setter 41. When supply of mixed water is to be stopped by the setter 41, the setter 41 is set to send a command signal to the main control means 100. The main control unit 100 control operation of the biasing force setter 102 to stop application of exciting current to the coil 35b, as in the manner as done in the foregoing arrangement employing the flow rate sensor 103. The setter 41 used as a mixed-water supply interruption detection means enables a rapid detection of interruption of the supply of mixed-water.

Although in the embodiments described above, the main control unit 100 recognizes interruption of the mixed water supply upon detection by one of the flow rate sensor 103, the shutoff position sensor 104 and the setter 41, two or more of the detectors 103, 104, 41 may be used concurrently. In the latter case, when at least one of detected signals issued from the detectors 103, 104, 41 is inputted into the main control unit 100, the main control unit 100 recognizes the mixed-water supply interruption condition and controls the operation of the biasing force setter 102 to terminate excitation of the coil 35b in the manner as described above. In FIGs. 15 and 16, flow regulating shutoff valve actuator 105 acts on the flow regulating shutoff valve 43 to actuate the latter under the control of the main control unit 100.

Figure 17:
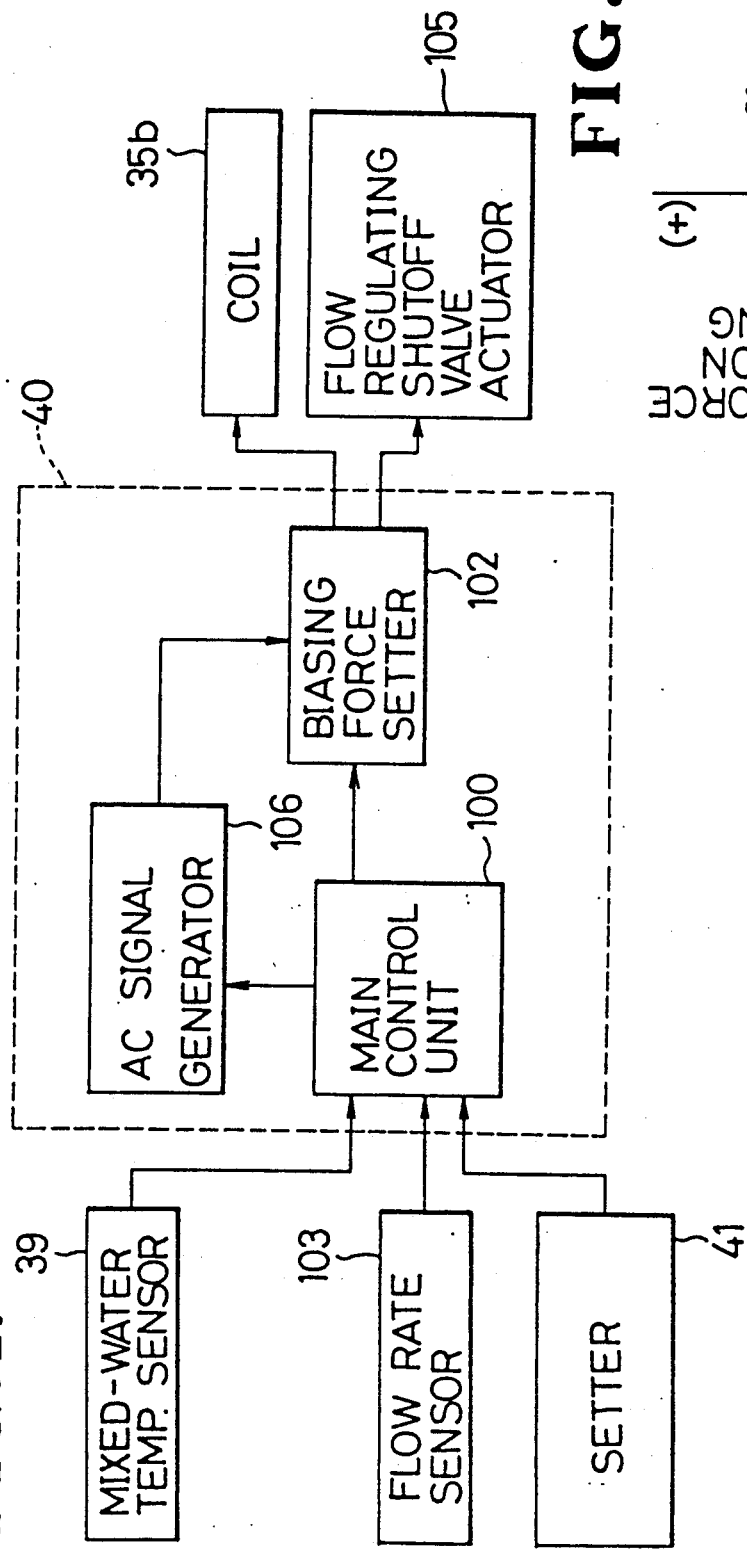
FIG. 17 is a view similar to FIG. 16, but showing a modified control unit.
Figure 18:
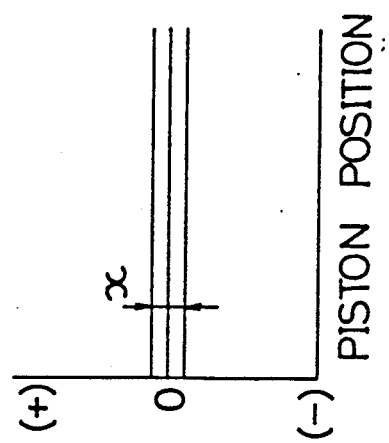
FIG. 18 is a graph showing the bias characteristics of the control unit shown in FIG. 17.

In the case where a direct current is supplied to the coil 35b of the water mixing device shown in FIG. 2 under the control of the control unit 40, a rapid movement of the connecting means 29 is difficult to obtain due to the hysteresis characteristics of the variable biasing means 35 composed of a magnetic circuit, or the friction produced when the connecting means 29 is driven. Consequently, the adjustment of the final water temperature takes a relatively long period of time. In order to overcome the foregoing difficulty, a modified control unit 40 includes, as shown in FIG. 17, an alternating-current (ac) signal generating means or generator 106 for generating an alternating-current signal upon receipt of a control signal from a main control unit 100. The alternating-current signal thus generated is supplied to a biasing force setter 102 and then is superposed upon an exciting current supplied to the coil 35b. The thus-superposed ac signal causes the connecting means 29 to generate slight vibrations. The vibrations have a relatively large frequency which is equivalent to the frequency generated by an ac power supply, and a small amplitude of vibration. Consequently, the vibrations do not provide a negative influence on the pressure regulating operation but, rather, enable the connecting means 29 to move smoothly, thereby improving the pressure regulating operation. A further advantage attained by the vibrations is that the hysteresis characteristic of the variable biasing means 35 and the frictional resistance created at a start of the connecting means 29 are reduced considerably. Importantly; the amplitude of vibration "x" is kept not to widely vary with the piston position, as shown in FIG. 18. In the case where a periodical alternating-current signal is used, the connecting means 29 may undergo a resonant vibration. In this instance, an irregular signal is used as an alternating-current signal to prohibit occurrence of the resonant vibration. In the illustrated embodiment, the alternating-current signal is produced inwardly of the control unit 40. However, a separate commercial power supply is used to superpose an alternating-current signal onto the exciting current, or alternatively a separate vibrating means which is structurally equivalent to the variable biasing means 35 is used to vibrate the connecting means 29 at all times.

In the water mixing devices of the preceding embodiments, the variable biasing means 35 operatively connected with the connecting means 29 is disposed adjacent to the cold-water side valve element 28. This arrangement improves the reliability of the variable biasing means 35 because the coil 35b is protected from overheating which may occur when the variable biasing means 35 is disposed adjacent to the hot-water side valve element 27. Furthermore, the stationary iron core, or the movable iron core or plunger 35a is cooled by cold water with the result that deposition of scales (calcium, silicon, etc. contained in water) on the inside surface of the water mixing device is considerably reduced. The change of scale deposition increases with an increase in water temperature. For example, the amount of scales deposited at 80° C. is several ten times as large as the amount of scales deposited at 40°C.

Figure 11:
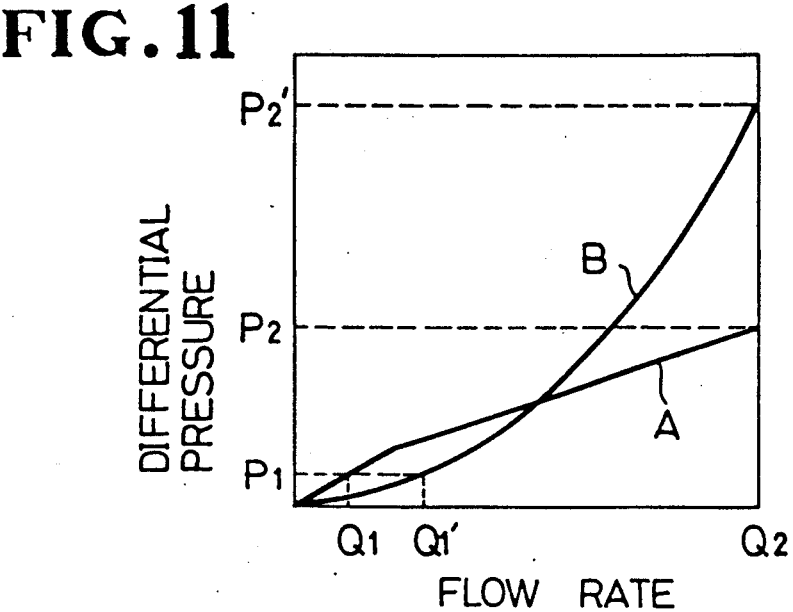
FIG. 11 is a graph showing the characteristics of the variable throttle.

FIG. 11 shows a water mixing device according to an eleventh embodiment of the present invention wherein the biasing force produced by a biasing means 82 can be adjusted by rotating a threaded manual adjustment means 107 in either direction. The biasing means 82 comprises a compression coil spring acting between an automatic pressure regulating valve 21 and the adjustment means 107 and urges the pressure regulating valve 21 upwardly in this figure toward a power-driven variable biasing means 35. The adjustment means 107 is composed of an end plug having an external thread 107a and threaded into a valve housing 23 with a casing 108 disposed therebetween.

The power-driven variable biasing means 35 is inoperative when the power supply is interrupted due to the accidental power failure or when a control unit (not shown) is malfunctioned due to an accident. In this instance, the adjustment means 107 is manually rotated to displace the pressure regulating valve 21, thereby adjusting the final water temperature. Since the biasing means 82 is connected at opposite ends to the automatic pressure regulating valve 21 and the adjustment means 107, rotation of the adjustment means in one direction increases the biasing force while rotation in the opposite direction decreases the biasing force. When water pressure changes during manual adjustment of the adjustment means 107, the automatic pressure regulating valve 21 operates to cancel out the pressure change, thereby reducing fluctuations of the final water temperature.

Figure 19:
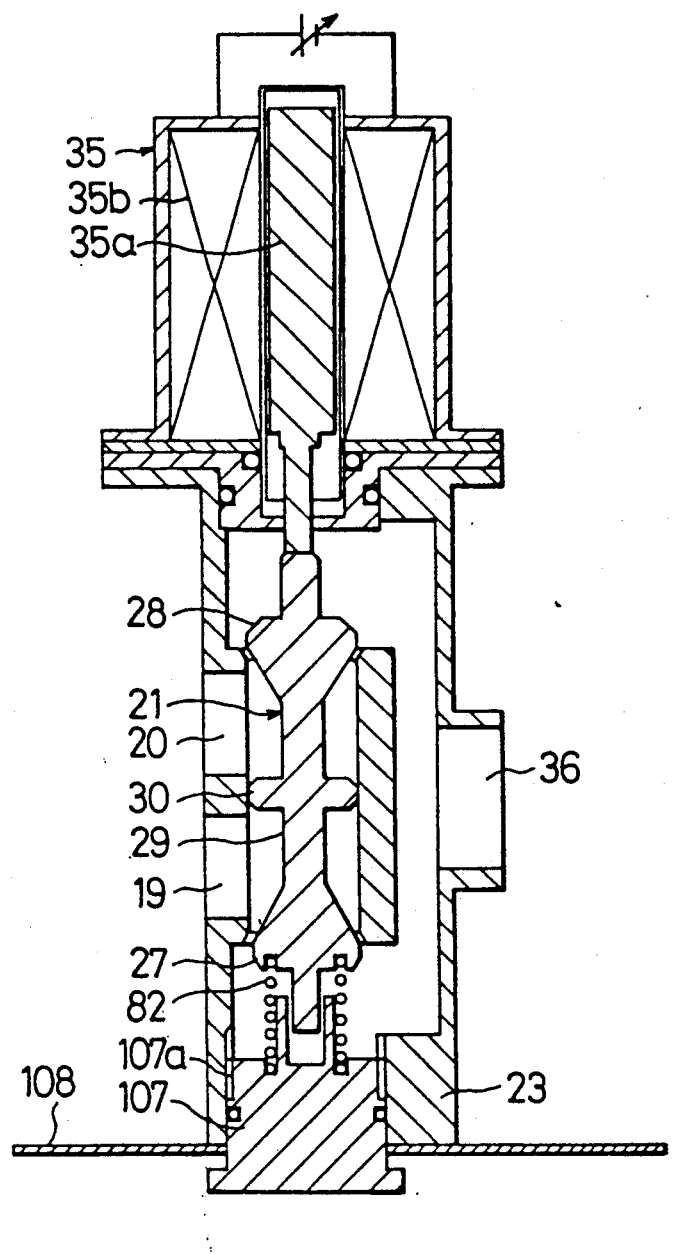
FIG. 19 is a diagrammatical cross-sectional view of a water mixing device according to an eleventh embodiment of the present invention.
Figure 20:
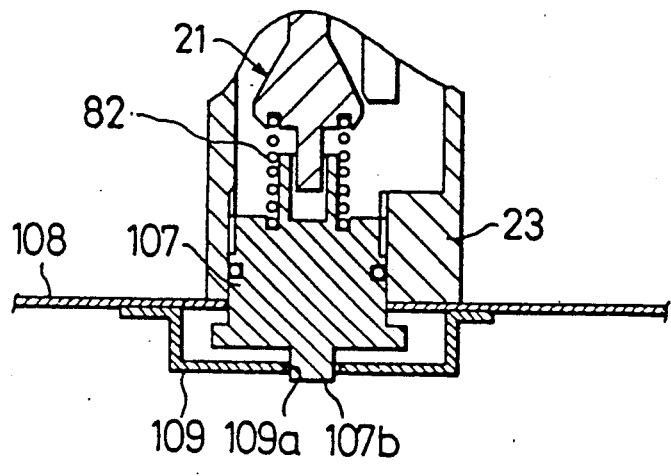
FIG. 20 is a fragmentary cross-sectional view of a position indicator incorporated in the water mixing device shown in FIG. 19.

FIG. 20 shows a modified form of the adjustment means 107. A cover 109 is attached to the casing 108 to substantially cover an outer end of the modified adjustment means 107. The adjustment means 107 has a projection 107b disposed centrally on an outer end face thereof and received in a central hole 109a in the cover 108. The projection 107b and the cover 109 jointly have a position indicator for indicating the position of the adjustment means 107 to facilitate positioning of the biasing means 82 to its initial position. The position indicator comprises a pair of matchmarks 110 (FIG. 20A) provided on an end face of the projection 107b and an end face of the cover 109. When the automatic control of the variable biasing means 35 (FIG. 19) is recovered after the adjustment means 107 is manually operated to adjust the biasing force of the biasing means 82, the adjustment means 107 is turned until the matchmarks 110 are brought into register with each other. Thus, the adjustment means 107 and the biasing means 82 are readily returned to their initial positions.

Figure 21A:
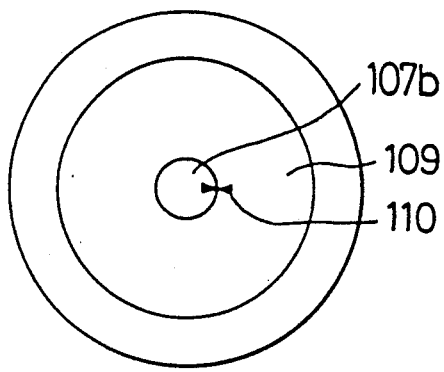
FIG. 21A is a front elevational view of the position indicator.
Figure 21B:
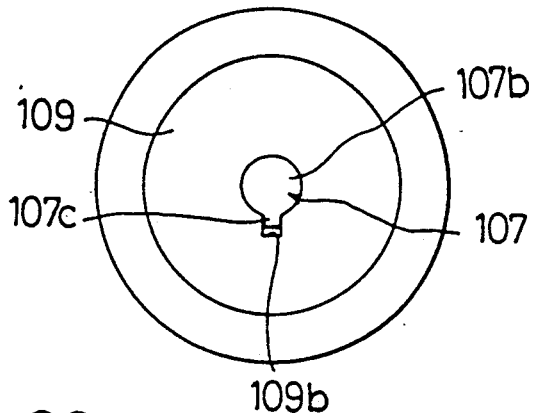
FIG. 21B is a view similar to FIG. 21A, but showing a modified form of the position indicator.

FIG. 21B shows a modified position indicator composed of a key 107 provided on the projection 107b and a keyway 109b formed in the cover 109. The key 107 is relievable only when the adjustment means 107 is located in its initial position. With the position indicator thus provided, the positioning of the biasing means 82 is achieved accurately with utmost ease.

Figure 22:
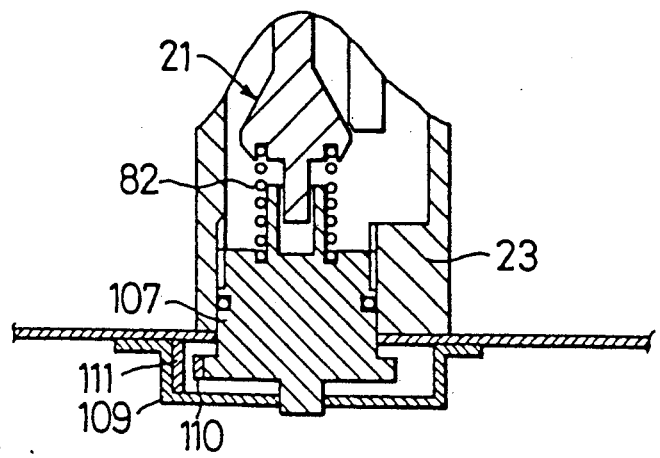
FIG. 22 is a view similar to FIG. 20, but showing an alternative position indicator.

A further modified form of the position indicator is shown in FIG. 22, which includes a permanent magnet 110 attached to an adjustment means 107, and a reed switch 111 attached to the cover 109. The reed switch 111 is adapted to be opened and closed depending on the position of the permanent magnet 110 relative to the reed switch 111. The reed switch 111 is normally open and it is closed to indicate the initial position of the adjustment means 107 when the permanent magnet 110 is in face to face confrontation to the reed switch 111. The reed switch 111 may be replaced by a mechanical switch or an optical switch.

Figure 23:
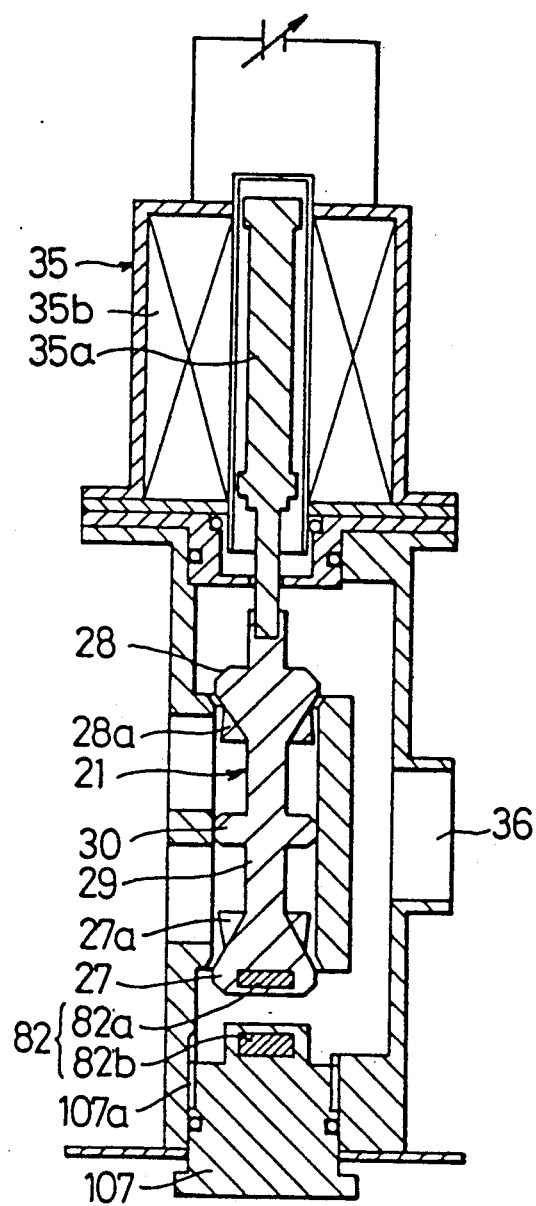
FIG. 23 is a diagrammatical cross-sectional view of a water mixing device according to a twelfth embodiment, the device incorporating a biasing means of the non-contact type.

FIG. 23 illustrates a water mixing device according to a twelfth embodiment of the present invention. The water mixing device includes a biasing means 82 using a repelling force produced between a pair of permanent magnets 82a, 82b. The permanent magnet 82a is embedded in an automatic pressure regulating valve 21 while the permanent magnet 82b is embedded in an adjustment means 107 in confrontation to the permanent magnet 82a. The adjustment means 107 has an external thread 107a and threaded to a valve housing, not designated, so that the biasing force produced by the biasing means 82 is adjustable by turning the adjusting means 107 in either direction to change the distance between the opposed permanent magnets 82a, 82b. Since the biasing means 82 exerts a biasing force on a connecting means 29 of the pressure regulating valve 21 in a non-contacting manner, a wide range of adjustment of the final water temperature is possible even when the biasing means 82 is combined with a variable biasing means 35 capable of producing a biasing force tending to move the connecting means 29 in one direction. Since the non-contacting biasing means 82 is held out of contact with hot water, an additional flow resistance is not induced by the biasing means 82 and the biasing means 82 is not deteriorated by hot water.

In FIG. 23, the variable biasing means 35 comprises a solenoid including a movable iron core or plunger 35a and an exciting coil 35b. The plunger 35a is connected to the connecting means 29 of the pressure regulating valve 21 and is movable both in the axial direction and the circumferential direction together with the connecting means 29. The hot-water side valve element 27 has a plurality of integral radial fins 27a acting as a rotational force generating means. Similarly, the cold-water side valve element 27 is provided with a plurality of radial fins 28a. The radial fins 27a, 28a react on flows of hot and cold water to rotate the connecting means 29 and the plunger 35a concurrently. With this rotation of the plunger, scales or dust deposited in a clearance between the plunger 35a and the coil 35b is removed even when the clearance is reduced to a minimum so as to substantially eliminate magnetic losses in the variable biasing means 35. The rotational force generating means is particularly advantageous when used with the illustrated variable biasing means 35 constructed to generate an electromagnetic force tending to attract magnetic particles contained in water.

Figure 24:
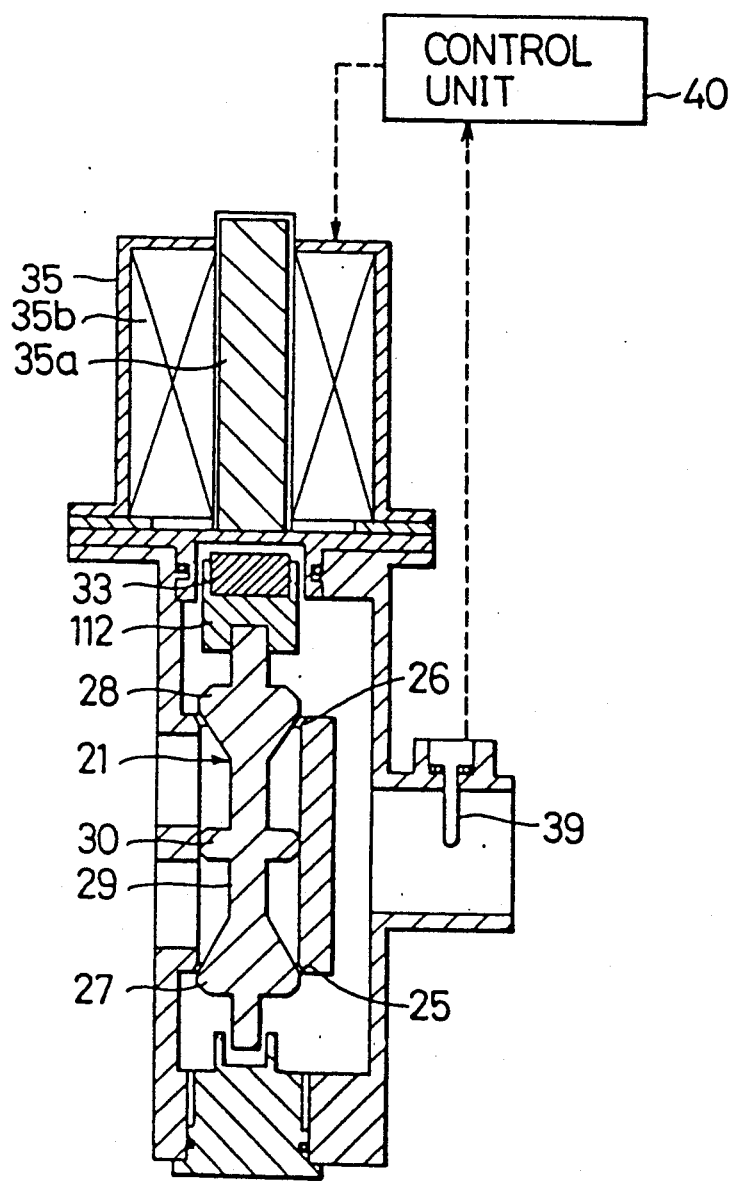
FIG. 24 is a view similar to FIG. 23, but showing a water mixing device according to a thirteenth embodiment including a variable biasing means including a permanent magnet.

FIG. 24 shows a water mixing device according to a thirteenth embodiment of the present invention wherein a variable biasing means 35 including a permanent magnet and a magnetic substance is used.

The variable biasing means (variable magnetic force generating means) 35 comprises a stationary iron core of a magnetic substance 35a, an exciting coil 35 and a permanent magnet 33. The permanent magnet 33 is mounted on a holder 112 connected to an end of an automatic pressure regulating valve 21 adjacent to a cold-water side valve element 28. When the exciting coil 35b is energized to magnetize the magnetic substance 35a, the permanent magnet 33 is attracted or repelled by the magnetized magnetic substance 35a, thereby displacing the pressure regulating valve 21 in the axial direction.

Figure 25:
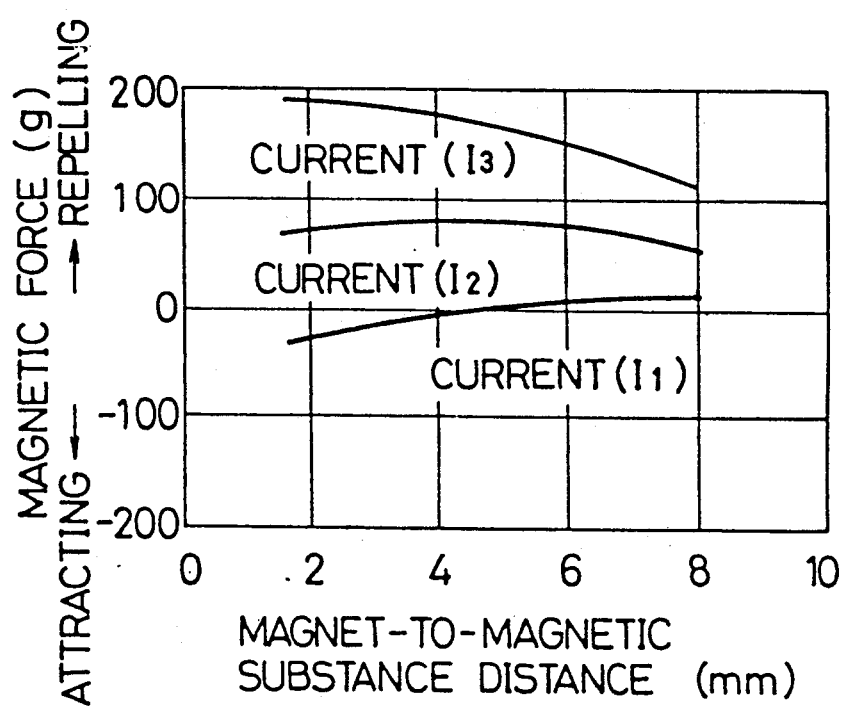
FIG. 25 is a graph showing the characteristics of a variable magnetic force generating means incorporated in the water mixing device shown in FIG. 24.

FIG. 25 illustrates the relation between exciting currents supplied to the coil 35b and the magnetic forces acting on the permanent magnet 33. When the control unit 40 (FIG. 24) issues a command signal for applying a positive exciting current to the coil 35b, the magnetic substance 35a is magnetized and produces a magnetic force tending to repel the permanent magnet 33, thereby displacing the connecting means 29 downward in FIG. 24. Conversely, when a negative exciting current is supplied to the coil 35b, the magnetic substance 35a produces a magnetic force tending to attract or pull the permanent magnet 33. Consequently, the connecting means 29 is displaced upwardly in FIG. 24 with the result that the hot-water side valve element 27 is closed while the cold-water side valve element 28 is opened.

While the coil 35b is de-energized, the permanent magnet 33 and the magnetic substance 35a are attracted toward each other to thereby move the pressure regulating valve 21 upwardly. This upward movement of the pressure regulating valve 21 causes the hot-water side valve element 27 to open and also causes the cold-water side valve element 28 to close concurrently, thereby lowering the final water temperature. With this arrangement, the mixed-water supplying operation can be achieved in safe even when the power supply is interrupted.

Figure 26:
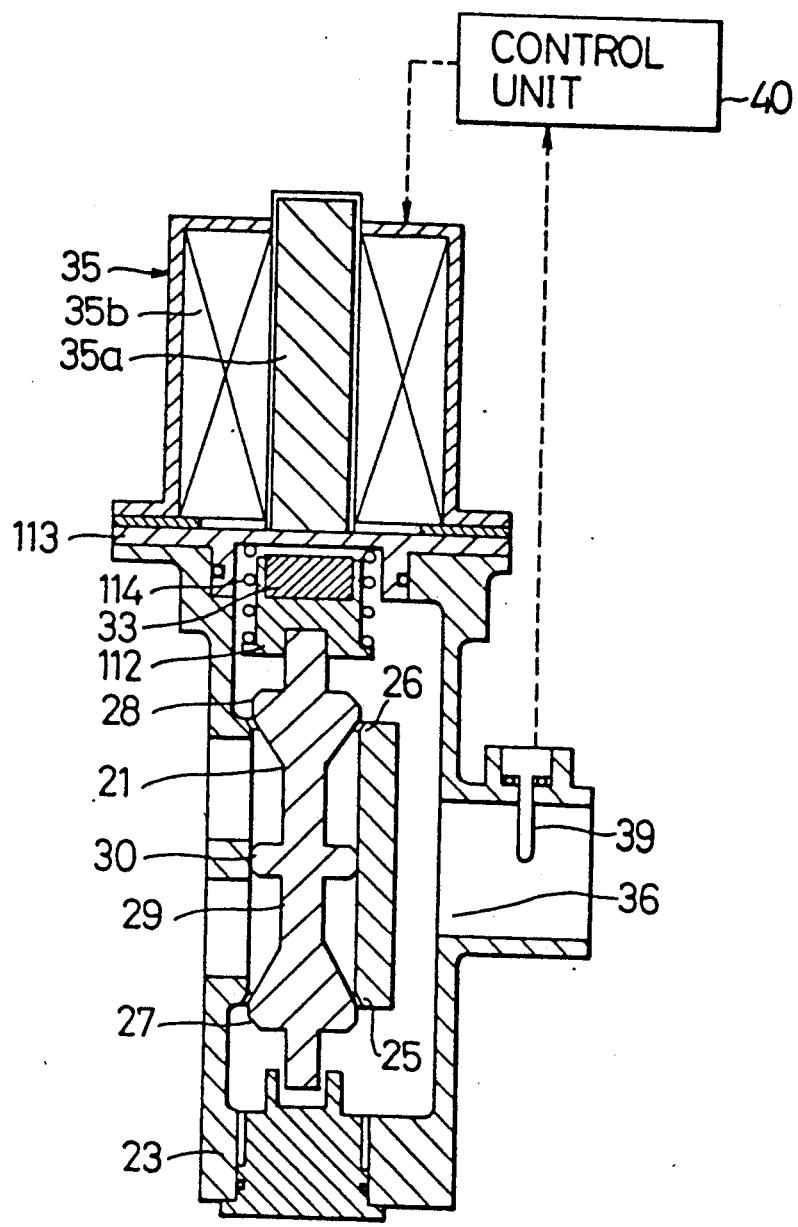
FIG. 26 is a diagrammatical cross-sectional view of a water mixing device according to a fourteenth embodiment, the device including a variable biasing means composed of a magnetic substance and a spring.

FIG. 26 shows a water mixing device according to a fourteenth embodiment of the present invention. The water mixing device includes a variable biasing means 35 utilizing the combination of a magnetic substance with a permanent magnet and a spring.

Stated more specifically, the variable biasing means 35 includes a stationary iron core of a magnetic substance 35a and an exciting coil 35b wound around the magnetic substance 35a for magnetizing the same. A permanent magnet 33 is mounted on a holder 112 connected to an end of an automatic pressure regulating valve 21 adjacent to a cold-water side valve element 28. The permanent magnet 33 and the magnetic substance 35a are disposed in face-to-face confrontation with an end plug 108 disposed therebetween. A compression coil spring 114 acts between the holder 112 and the end plug 113 and urges the pressure regulating valve 21 downward in FIG. 26. The spring 114 constitute a part of the variable biasing means 35. When the exciting coil 35b is energized, the magnetic substance 35a is magnetized whereupon the permanent magnet 33 is attracted or repelled by the magnetized magnetic substance 35a, thereby displacing the pressure regulating valve 21 in the axial direction.

Figure 27:
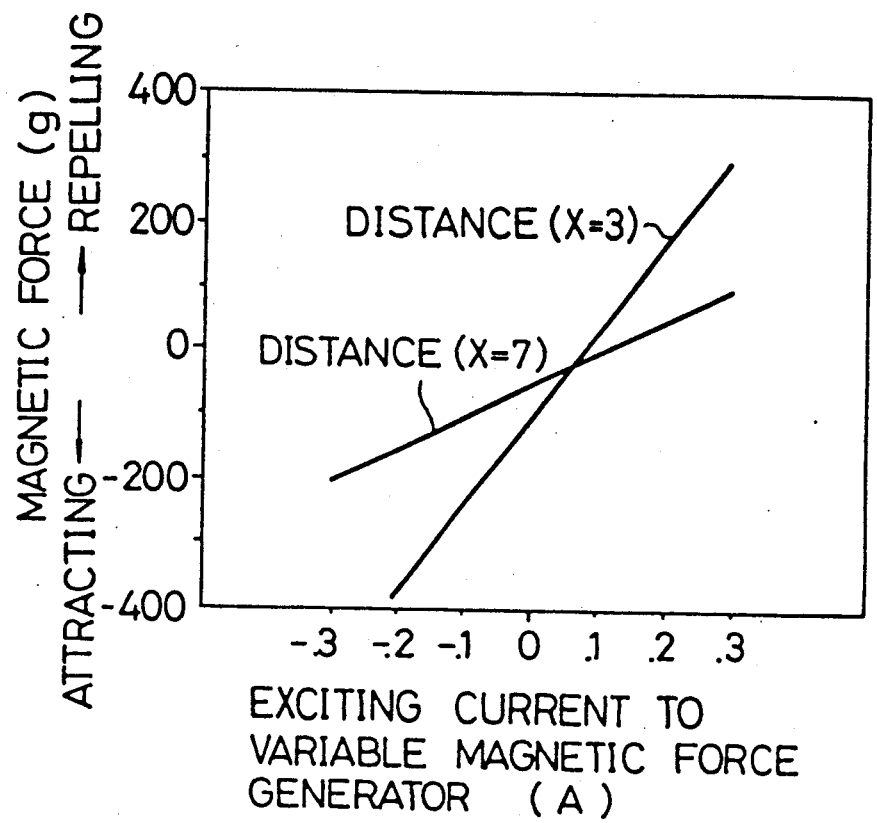
FIG. 27 is a graph showing the characteristics of a variable magnetic force generating means incorporated in the water mixing device shown in FIG. 26.
Figure 28:
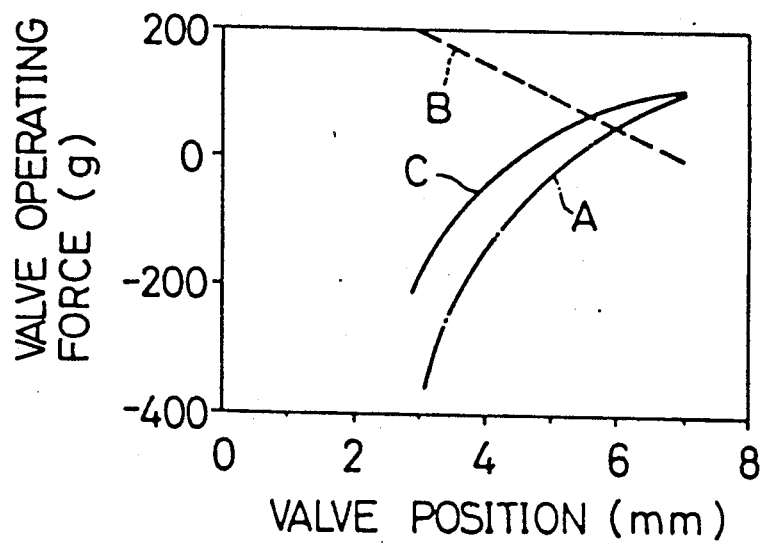
FIG. 28 is a graph showing the characteristics of the variable biasing means.

FIG. 27 illustrates the relation between the exciting current supplied to the exciting coil 35b and the magnetic force acting on the permanent magnet 33. As appears clear from this figure, the magnetic force varies depending on the distance between the magnetic substance 35a and the permanent magnet 33. The valve position can be controlled by changing the exciting current supplied to the coil 35b. The force of the spring 114 has direct effects on the control of the valve position, as described below with reference to FIG. 28. FIG. 28 is the combination of FIG. 27 with the characteristics of the spring 114. In FIG. 28, a characteristic curve A indicates the electromagnetic force acting on the magnetic substance 35a when the exciting current supplied to the coil 35b is changed, a characteristic curve B indicates the force of the spring 114, and a characteristic curve C indicates the composite force obtained by combination of the characteristic curves A and B. As appears clear from the characteristic curve A, the valve operating force changes steeply as the valve position becomes small. Conversely, the characteristic curve C incorporated with the force of the spring 114 indicates that the valve operating force changes gently as the valve position is changed and it has substantially the same values as the valve operating force of the characteristic curve A in a region adjacent to the maximum valve displacement.

When a control unit 40 (FIG. 26) issues a command signal to apply a positive exciting current to the coil 35b, the magnetic substance 35a is magnetized and produces an electromagnetic force tending to repel the permanent magnet 33. As a consequence, the connecting means 29 is displaced downwardly in FIG. 26. Conversely, when a negative exciting current is supplied to the coil 35b, the magnetic substance 35a attracts the permanent magnet 33 so that the connecting means 29 is moved upwardly against the force of the spring 114 so as to close the hot-water side valve element 27 and open the cold-water side valve element 28 concurrently. The spring 114 thus provided accommodates a sudden change of valve operating force which would occur when the valve displacement is relatively small. With this arrangement, the water mixing valve can easily be controlled accurately without the occurrence of pulsation of the pressure regulating valve 21.

Obviously various minor changes and modifications of the present invention are possible in the light of the above teaching. It is therefore to be understood that within the scope of the appended climes the invention may be practiced otherwise than as specifically described.

What is claimed is:

1. A hot-water and cold-water mixing device, comprising:
   (a) a hot-water passage and a cold-water passage;
   (b) a hot-water side valve element for reducing a primary pressure in said hot-water passage, and a cold-water side valve element for reducing a primary pressure in said cold-water passage;
   (c) connecting means for transmitting a differential pressure created between a secondary pressure of hot water acting on said hot-water side valve element and a secondary pressure of cold water acting on said cold-water side valve element;
   (d) variable biasing means drivable under the control of an external driving force for producing a variable biasing force acting in conjunction with said differential pressure acting on said connecting means;
   (e) a mixing portion for permitting hot and cold water to blend together; and
   (f) hot-water side flow resistance means disposed between a secondary side of said hot-water side valve element and said mixing portion and cold-water side flow resistance means disposed between a secondary side of said cold-water side valve element and said mixing portion, said hot-water side flow resistance means and said cold-water side flow resistance means being unresponsive to said external driving force.

2. A hot-water and cold-water mixing device as claimed in claim 1, wherein:
   said hot-water side flow resistance means and said cold-water side flow resistance means comprise a pair of confronting stationary orifices disposed on opposite sides of said mixing portions, and each of said orifices further serves as means for promoting mixing of hot and cold water.

3. A hot-water and cold-water mixing device as claimed in claim 1, wherein:
said hot-water side flow resistance means and said cold-water side flow resistance means comprise a pair of confronting stationary perforated plates disposed on opposite sides of said mixing portions, and each of said perforated plates also serves as means for promoting mixing of hot and cold water.

4. A hot-water and cold-water mixing device as claimed in claim 1, wherein:
each of said hot-water side flow resistance means and said cold-water side flow resistance means comprises variable flow resistance means capable of producing a flow resistance variable with the flow rate of hot water or the flow rate of cold water.

5. A hot-water and cold-water mixing device as claimed in claim 4, wherein:
said hot-water side variable flow resistance means comprises a first valve element and said cold-water side variable flow resistance means comprises a second valve element connected with said first valve element for movement in unison with said first valve element, further including a supply flow rate setter for setting a desired flow rate of hot water to be supplied, and a control unit for adjusting the position of said first and second valve elements to vary the flow resistances of the respective valve elements according to said desired flow rate.

6. A hot-water and cold-water mixing device as claimed in claim 1, wherein:
each of said hot-water side flow resistance means and said cold-water side flow resistance means comprises a linear flow resistance member capable of varying the corresponding flow rate in direct proportion to said differential pressure created between said valve elements.

7. A hot-water and cold-water mixing device as claimed in claim 6, wherein:
each of said linear flow resistance members comprises a reticular element having a multitude of fine 8. A hot-water and cold-water mixing device as claimed in claim 1, wherein:
said hot-water side flow resistance means and said cold-water side flow resistance means are mounted on said connecting means and movable in unison with said connecting means, and each of said flow resistance means also serves as differential pressure generating means.

9. A hot-water and cold-water mixing device as claimed in claim 8, wherein:
said connecting means comprises a hollow cylinder, both of said valve elements being provided on an outer peripheral surface of said hollow cylindrical connecting means, said differential pressure generating means being mounted within said hollow cylindrical connecting means.

10. A hot-water and cold-water mixing device as claimed in claim 9, wherein:
said hollow cylindrical connecting means has a number of perforations formed in its peripheral wall in a region extending between said differential pressure generating means and facing said mixing portion.

11. A hot-water and cold-water mixing device as claimed in claim 1, wherein:
each of dais hot-water side flow resistance means and said cold-water side flow resistance means comprises a variable throttle having an opening which is variable with the corresponding flow rate of hot water or cold water passing therethrough.

12. A hot-water and cold-water mixing device as claimed in claim 11, wherein:
said variable throttle includes a fixed valve seat, a ring-shaped movable valve element, and a spring urging said movable valve element against the valve seat.

13. A hot-water and cold-water mixing device as claimed in claim 12, wherein:
said valve seat has a plurality of circumferentially spaced perforations facing said mixing portion for promoting mixing of hot and cold water.

14. A hot-water and cold-water mixing device as claimed in claim 1, wherein:
each of said hot-water side flow resistance means and said cold-water side flow resistance means comprises a variable throttle associated with a corresponding one of said hot-water side valve element and said cold-water side valve element and having an opening which is variable with the corresponding flow rate of hot water or cold water passing therethrough.

15. A hot-water and cold-water mixing device as claimed in claim 14, wherein:
said connecting means comprises a hollow cylinder, both of said valve elements being integral with the peripheral wall of said hollow cylindrical connecting means, said variable throttles being disposed within said hollow cylindrical connecting means.

16. A hot-water and cold-water mixing device as claimed in claim 1, wherein:
said hot-water and cold-water passages having respective portions provided on the secondary side of said valve elements, said hot-water and cold-water passage portions extending longitudinally along said connecting means in opposite directions and blending together at a central portion of said connecting portion.

17. A hot-water and cold-water mixing device as claimed in claim 1, wherein:
each of said hot-water side valve elements and said cold-water side valve elements comprises a hollow cylinder having a plurality of confirumferentially spaced adjustment holes for adjusting the flow rate in a reverse-proportional manner, each of said hot-water side flow resistance means and said cold-water side flow resistance means comprising a perforated turbulence plate disposed within a corresponding one of said cylinder is in confronting relationship to the opposite perforated turbulence plate and extending perpendicular to a common longitudinal axis of said cylinders.

18. A hot-water and cold-water mixing device as claimed in claim 1, further comprising:
a control unit selectively producing a command signal to discontinue power supply to said variable biasing means when mixed water supply is to be interrupted or when a predetermined period of time elapses after interruption of the mixed-water supply.

19. A hot-water and cold-water mixing device as claimed in claim 1, further comprising:

means for exerting a slight vibratory motion on said connecting means.

20. A hot-water and cold-water mixing device as claimed in claim 1, wherein said variable biasing means is disposed at one side of said connecting means adjacent to said cold-water side valve element.

21. A hot-water and cold-water mixing device as claimed in claim 1, further comprising:
biasing means for urging said connecting means in such a direction as to move said valve elements against a force of said variable biasing means.

22. A hot-water and cold-water mixing device as claimed in claim 21, wherein:
said biasing means is operative to urge said connecting means in non-contacting manner.

23. A hot-water and cold-water mixing device as claimed in claim 22, wherein:
said biasing means includes a first permanent magnet mounted on said connecting means and movable together with said connecting means, and a stationary second permanent magnet held in confrontation to said first movable permanent magnet, said first and second permanent magnets being oriented so as to magnetically repel one another.

24. A hot-water and cold-water mixing device as claimed in claim 21, further comprising:
adjustment means for adjusting the position of said biasing means, for thereby changing the biasing force produced by said biasing means.

25. A hot-water and cold-water mixing device as claimed in claim 22, further comprising:
a position indicator associated with said adjustment means for indicating the initial position of said adjustment means.

26. A hot-water and cold-water mixing device as claimed in claim 24, wherein said rotational force generating means comprises at least one turbine mounted on said connecting means and having a plurality of skewed blades.

27. A hot-water and cold-water mixing device as claimed in claim 24, wherein:
said rotational force generating means comprises a plurality of radial wings disposed on each of said valve elements.

28. A hot-water and cold water mixing device as claimed in claim 1, wherein:
said variable biasing means comprises a permanent magnet mounted on said connecting means, a variable magnetic force generating means for generating a variable magnetic force acting on said permanent magnet, and a spring exerting a magnetic force tending to attract said permanent magnet toward said variable force generating means.

29. A hot-water and cold-water mixing device, comprising:
(a) a hot-water passage and a cold-water passage;
(b) a hot-water side valve element for reducing a primary pressure in said hot-water passage, and a cold-water side valve element for reducing a primary pressure in said cold-water passage;
(c) connecting means for transmitting a differential pressure created between a secondary pressure of hot water acting on said hot-water side valve element and a secondary pressure of cold water acting on said cold-water side valve element;
(d) variable biasing means for producing a variable biasing force acting on said differential pressure acting on said connecting means, said variable biasing means being operative to produce a biasing force variable to change the final water temperature in such a manner that the final water temperature is lowered with a reduction of the biasing force, said hot-water side valve element being substantially closed when a power supply to said variable biasing means is interrupted;
(e) a mixing portion for permitting hot water and cold water flows to blend together; and
(f) hot-water side flow resistance means disposed between a secondary side of said hot-water side valve element and said mixing portion, and cold-water side flow resistance means disposed between a secondary side of said cold-water side valve element and said mixing portion.

30. A hot-water and cold-water mixing device, comprising:
(a) a hot-water passage and a cold-water passage;
(b) a hot-water side valve element for reducing a primary pressure in said hot-water passage, and a cold-water side valve element for reducing a primary pressure in said cold-water passage;
(c) connecting means for transmitting a differential pressure created between a secondary pressure of hot water acting on said hot-water side valve element and a secondary pressure of cold water acting on said cold-water side valve element;
(d) variable biasing means for producing a variable biasing force acting on said differential pressure acting on said connecting means;
(e) a mixing portion for permitting hot and cold water to blend together;
(f) hot-water side flow resistance means disposed between a secondary side of said hot-water side valve element and said mixing portion and cold-water side flow resistance means disposed between a secondary side of said cold-water side valve element and said mixing portion; and
(g) means drivable by a stream of water to generate a rotational force tending to rotate said connecting means and said valve elements.

31. A hot-water and cold-water mixing device, comprising
(a) a hot-water passage and a cold-water passage;
(b) a hot-water side valve element for reducing a primary pressure in said hot-water passage, and a cold-water side valve element for reducing a primary pressure in said cold-water passage;
(c) connecting means for transmitting a differential pressure created between a secondary pressure of hot water acting on said hot-water side valve element and a secondary pressure of cold water acting on said cold-water side valve element;
(d) variable biasing means for producing a variable biasing force acting on said differential pressure acting on said connecting means, said variable biasing means comprising a permanent magnet mounted on said connecting means, and a variable magnetic force generating means for generating a variable magnetic force acting on said permanent magnet;
(e) a mixing portion for permitting hot and cold water to blend together; and
(f) hot-water side flow resistance means disposed between a secondary side of said hot-water side valve element and said mixing portion, and cold-water side flow resistance means disposed between a secondary side of said cold-water side valve element and said mixing portion.

32. A hot-water and cold-water mixing device, comprising:
   (a) a hot-water passage and a cold-water passage;
   (b) a hot-water side valve element for reducing a primary pressure in said hot-water passage, and a cold-water side valve element for reducing a primary pressure in said cold-water passage;
   (c) connecting means for transmitting a differential pressure created between a secondary pressure of hot water acting on said hot-water side valve element and a secondary pressure of cold water acting on said cold-water side valve element;
   (d) variable biasing means for producing a variable biasing force acting on said differential pressure acting on said connecting means;
   (e) a mixing portion for permitting hot and cold water to blend together;
   (f) hot-water side flow resistance means disposed between a secondary side of said hot-water side valve element and said mixing portion, and cold-water side flow resistance means disposed between a secondary side of said cold-water side valve element and said mixing portion;
   (g) temperature detecting means for detecting the temperature of mixed water at said mixing portion;
   (h) setting means for setting a desired mixed-water temperature; and
   (i) control means for controlling operating of said variable biasing means until a detected signal received from said temperature detecting means is equal to a signal received from said setting means.

* * * * *

UNITED STATES PATENT AND TRADEMARK OFFICE
CERTIFICATE OF CORRECTION

PATENT NO. : 5,033,671

DATED : July 23, 1991

INVENTOR(S) : Fumikazu SHIBA, Yasukiyo UEDA, Hiroaki YONEKUBO, Yukio NAGAOKA, and Yasuo KIDOUCHI It is certified that error appears in the above-identified patent and that said Letters Patent is hereby corrected as shown below:

Column 22 -
　　Line 49:　　"confirumferentially" should read --circumferentially--.

Column 5 -
　　Line 54:　　"34" should read --33--.

Column 6 -
　　Line 56:　　"34" should read --33--.

Column 14 -
　　Line 46:　　"101" should read --102--.

Column 17 -
　　Line 6:　　"Fig. 11" should read --Fig. 19--.

Signed and Sealed this

Twenty-seventh Day of April, 1993

*Attest:*

MICHAEL K. KIRK

*Attesting Officer*　　Acting Commissioner of Patents and Trademarks